United States Patent [19]

Perron et al.

[11] Patent Number: 5,523,957
[45] Date of Patent: Jun. 4, 1996

[54] PROCESS FOR CONTROLLING ROTARY CALCINING KILNS, AND CONTROL SYSTEM THEREFOR

[75] Inventors: Jean Perron, Chicoutimi; Marc Auger, Jonquiere, both of Canada

[73] Assignee: Alcan International Limited, Montreal, Canada

[21] Appl. No.: 249,142

[22] Filed: May 25, 1994

Related U.S. Application Data

[63] Continuation-in-part of Ser. No. 92,393, Jul. 15, 1993, Pat. No. 5,456,761.

[51] Int. Cl.⁶ .................................................. G06F 19/00
[52] U.S. Cl. ............................................... 364/503; 364/477
[58] Field of Search .................................. 364/477, 503; 395/61, 900, 906; 432/19, 45, 18, 49, 105, 109, 103, 14; 201/27, 32; 110/246; 106/743, 760; 423/345; 136/232, 233, 234; 374/139, 179, 208

[56] References Cited

U.S. PATENT DOCUMENTS

| | | | |
|---|---|---|---|
| 3,280,312 | 10/1966 | Sandelien | 364/503 |
| 3,647,195 | 3/1972 | Drewry | 423/45 |
| 3,966,560 | 6/1976 | Farago et al. | 423/19 |
| 4,022,569 | 5/1977 | Farago et al. | 432/14 |
| 4,038,153 | 7/1977 | Deruelle et al. | 201/27 |
| 4,092,098 | 5/1978 | Honaker et al. | 432/19 |
| 4,834,648 | 5/1989 | Angelo, II | 432/103 |
| 4,894,904 | 1/1990 | Nakano | |
| 4,910,684 | 3/1990 | Ostergaard et al. | 364/503 |
| 5,173,283 | 12/1992 | Parent | 423/345 |

FOREIGN PATENT DOCUMENTS

| | | |
|---|---|---|
| 0314807 | 5/1989 | European Pat. Off. |
| 2270317 | 12/1985 | France |
| 2524951 | 1/1976 | Germany |
| 2157442 | 10/1985 | United Kingdom |
| 9304504 | 3/1993 | WIPO |

*Primary Examiner*—Roy N. Envall, Jr.
*Assistant Examiner*—Steven R. Garland
*Attorney, Agent, or Firm*—Cooper & Dunham

[57] ABSTRACT

A process and control system for controlling a rotary calcining kiln having a feed material inlet for material to be calcined, a calcined product outlet and a high temperature zone in which said material is calcined, the high temperature zone being movable within the rotary calcining kiln according to changes in operational control variables of the rotary calcining kiln. The process comprises measuring temperatures within the rotary calcining kiln at various positions spaced from each other along the rotary calcining kiln in a region overlapping a predetermined desired position for the high temperature zone, and adjusting the control variables to move the high temperature zone to the desired position when the high temperature zone deviates from the desired position. In the process, the temperatures are measured by thermocouples having thermocouple junctions protected by heat and abrasion resistant sheaths, preferably made of alumina/silicon carbide ceramics, positioned within the rotary calcining kiln.

18 Claims, 13 Drawing Sheets

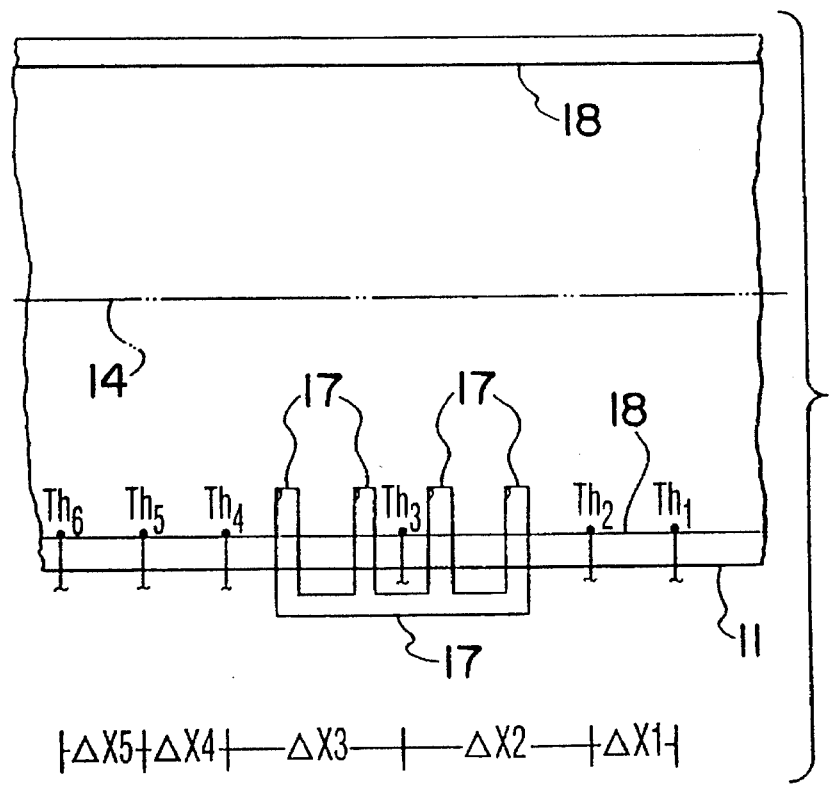
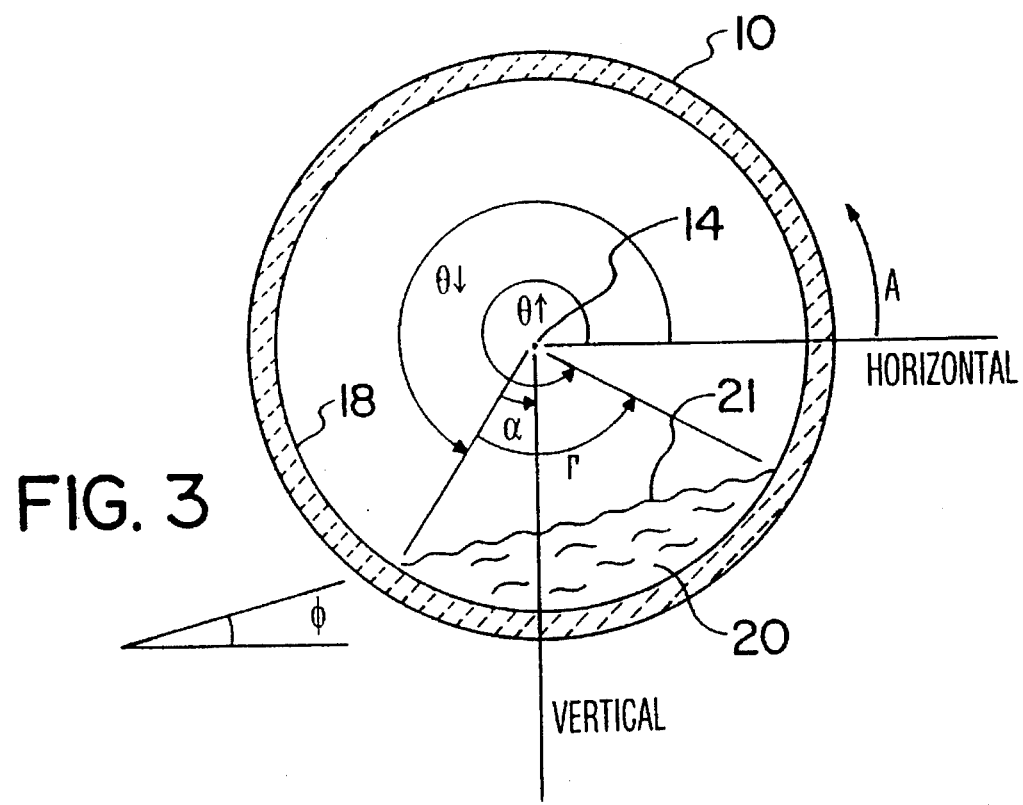

PROCESS FOR CONTROLLING ROTARY CALCINING KILNS, AND CONTROL SYSTEM THEREFOR

CROSS-REFERENCE TO RELATED APPLICATION

This application is a continuation-in-part of application Ser. No. 08/092,393 filed Jul. 15, 1993, now U.S. Pat. No. 5,456,761.

BACKGROUND OF THE INVENTION

I. Field of the Invention

This invention relates to the control of rotary calcining kilns used for calcining various materials, e.g. coke and alumina, and to a control system suitable for the process.

II. Discussion of the Prior Art

Rotary calcining kilns are used in industry to heat or calcine various materials. Such rotary calcining kilns normally consist of a refractory-lined elongated hollow cylinder (often referred to as a "shell"), which can be rotated about its longitudinal axis and which has a feed inlet at one end and a discharge outlet at the opposite end. The tubular shell slopes downwardly from the inlet end to the outlet end by a normally fixed angle from the horizontal, so that material moves gradually along the inside of the shell from the inlet to the outlet by the effect of gravity as the shell is rotated. The interior of the shell is heated by means described more fully below so that the material is heated or calcined as it moves through the interior of the shell.

When certain materials are heat treated in rotary calcining kilns in this way, the nature or yield of the product material may be affected by the operation of the rotary calcining kiln, so that it is desirable to control the rotary calcining kiln in a precise manner particularly suited for the material undergoing the heating process. In particular, it is often desirable to control the temperature profile of the material as it moves through the rotary calcining kiln, but it is usually difficult to measure the temperatures within the rotary calcining kiln with any degree of accuracy because of the harsh conditions which normally exist in the rotary calcining kiln interior, so precise control of the temperature profile is often difficult or impossible.

The calcination of petroleum coke illustrates the difficulties which can be encountered. Petroleum coke is used for the manufacture of carbon electrodes, linings for aluminum reduction cells, and the like. The coke undergoes a calcination step in a rotary calcining kiln in order to remove moisture and combustible volatiles from the green coke and to shrink the coke to a desired density, e.g. up to about 2.1 g/cc. It is also important to bring about an increase the average crystal length ($L_c$) of the coke from about 15 Å, to about 32 Å, during the calcination step because products of long average crystal length are more useful and valuable. However, it has been difficult to achieve suitable crystal length enlargement in a consistent manner because the control variables of the rotary calcining kiln seem to affect crystal length in ways which are difficult to predict.

As the coke moves through the rotary calcining kiln, hot combustion gases, produced for example by burning oil or natural gas, may be introduced into the rotary calcining kiln near its outlet end in order to supplement the existing flow of hot combustion gases running counter current to the movement of coke through the rotary calcining kiln. The combustion gases heat the green coke to the desired calcination temperature as it passes through a high temperature calcination zone in the interior of the rotary calcining kiln. In the calcination zone, volatile materials are driven from the coke in such amounts that a fluidized bed is normally established in the mass of coke particles. Tertiary air is often introduced into the rotary calcining kiln in order to enhance the combustion of volatiles, thus forming a so-called "fireball" inside the rotary calcining kiln, and the various resulting gaseous products are discharged from the calcining zone at its upper end. The combustion of the volatiles inside the rotary calcining kiln permits a reduction of the amount of fuel required to bring about the desired calcination process. However, if the calcined coke discharged from the rotary calcining kiln is too hot as a result of the burning of the volatiles within the rotary calcining kiln, the yield of coke product may be decreased because of rapid combustion that takes place as the hot coke encounters the open air.

In U.S. Pat. No. 3,966,560 which issued on Jun. 29, 1976, and is assigned to Alcan Research And Development Limited, a process is disclosed in which the tertiary air is introduced in a controlled manner into a rotary calcining kiln through tuyeres at points spaced from both the green coke inlet and the calcined coke outlet. By carefully controlling the amount of tertiary air and the speed of travel of the coke through the rotary calcining kiln, the hottest part of the coke bed can be kept at a suitable distance from the discharge end of the rotary calcining kiln, thus allowing the calcined coke to cool to some extent before it is discharged into the atmosphere and consequently reducing combustion losses. In this process, nearly all of the heat required for calcining the coke can usually be produced by the combustion of the volatiles driven out of the green coke feed material, and yet a good yield of calcined product can be obtained.

For maximum efficiency of operation of the above type of rotary calcining kiln, the tertiary air should be introduced into the rotary calcining kiln in the region of the maximum evolution of volatiles, i.e. in the region of maximum temperature of the coke. Since the air inlets are fixed, this means that the rate of travel of the coke through the rotary calcining kiln must be adjusted, e.g. by adjusting the rate of rotation of the rotary calcining kiln and/or the amount of green coke fed to the rotary calcining kiln, so that the maximum temperature region coincides with the air inlets. It is also necessary to control the amount of tertiary air introduced into the rotary calcining kiln in such a way that the volatiles are properly burned, but the solid coke material is not consumed. In order to control the operation of the rotary calcining kiln, the temperature of the coke is measured in various regions by means of optical pyrometers and adjustments are made to the speed of rotation, air flow, feed of green coke, etc., to maintain optimal conditions. Additionally, television cameras may be used to observe the position of the fluidized region of the coke and adjustments made to the variables when the fluidized region appears to move away from the desired position in the rotary calcining kiln.

In Canadian Patent No. 1,052,313 issued on Apr. 10, 1979 to Merlyn M. Williams and assigned to Alcan Research And Development Limited, the difficulty of using optical pyrometers to measure temperatures within the rotary calcining kiln is addressed, taking into special consideration the fact that a discharge of smoky gases can lead to a false reading of an optical pyrometer located at the discharge end of the rotary calcining kiln. The solution to this problem, according to this patent, is to provide an additional optical pyrometer spaced from the discharge end of the calciner and to operate an air supply when the output from the additional pyrometer becomes unstable in order to prevent a smoky discharge zone from affecting the output of the additional optical pyrometer.

While this presents a solution to the problem posed by smoky discharge zones, it does not overcome the more basic problem that optical pyrometers are not capable of producing very reliable temperature readings even when smoky conditions are avoided and that their reaction time to temperature variations can be slow. Furthermore, the pyrometers cannot be designed to make precise measurements at locations positioned deeply within the kiln.

In the absence of accurate, fast and reliable temperature readings suitable for most processes, it has been found that it is particularly difficult to operate rotary calcining kilns at maximum efficiency, i.e. at maximum throughput, while reliably producing a properly calcined coke having high $L_c$ values and a high yield. As will be appreciated, at high rates of throughput, departures from ideal temperature conditions within the rotary calcining kiln must be detected and corrected rapidly, otherwise the process quickly becomes unstable and efficiency declines. Moreover, the effects of adjustments of individual variables used for the control of the rotary calcining kiln on the yield and nature of the calcined product can only be understood and predicted if the temperature changes produced by those adjustments can be detected quickly and reliably.

While the above description has been concerned with coke rotary calcining kilns, rapid and reliable control of rotary calcining kilns used for heating or calcining other materials, such as alumina, is also desired in order to improve product quality and yield. For example, the activity of activated alumina is affected by the temperature profile of the alumina as it passes through the rotary calcining kiln.

The keys to achieving proper control of such processes are the accurate, rapid and reliable measurement of temperatures at strategic points and the location of the calcination zone within the rotary calcining kiln. However, such measurements have been difficult or impossible in the past, e.g. by using optical pyrometers and remote television cameras. While the use of thermocouples could conceivably make it possible to measure temperatures more rapidly and reliably, thermocouples have not been used in rotary calcining kilns of this kind because the high temperatures and highly abrasive conditions to which they are inevitably exposed result in an operational lifetime which is so short that the use of exposed thermocouples cast directly into the refractory lining becomes impractical. An additional problem is that there is no procedure to replace the damage thermocouple.

U.S. Pat. No. 4,834,648 to Angelo relates to the treatment of contaminated earth in a rotary calciner to destroy the contaminants. A series of data collection devices is mounted along the heating plenum and these devices are said to be capable of measuring various factors, such as the temperature and gas make-up at all stages of the process. It is also stated that the devices are protected against the extreme heat of the kiln by reason of cooling of the chamber by cooling gas or other gas circulating therein. However, the use of cooling gases to protect temperature sensors is clearly not desirable in most calcination processes because this would affect the desired temperature profile within the kiln. Moreover, it is not clear how Angelo avoids rapid abrasion of the data collection devices, but perhaps this is unnecessary given the type of material being calcined.

Even if accurate and rapid temperature measurements could be made at points within the rotary calcining kiln, however, there are still so many variables that can affect the temperature profile, particularly for coke calcination, that temperature information in itself might not be enough for efficient rotary calcining kiln operation and the production of a desirable product. There is thus a need not only for a way of quickly and accurately measuring temperatures within a rotary calcining kiln, but also a way of using that temperature information to control operational variables, such as the speed of rotation of the rotary calcining kiln, the rate of input of material, the tertiary air flow rate, etc., in order to achieve optimal rotary calcining kiln operation.

OBJECTS OF THE INVENTION

Accordingly, an object of the invention is to provide a process and a control system for the operation of a rotary calcining kiln in order to maximize the efficiency of the heat treatment carried out in the rotary calcining kiln and to optimize the yield and quality of the product.

Another object of the invention is to provide a process and control system of this kind which relies on accurate and rapid temperature measurements of material within the rotary calcining kiln interior.

Yet another object of the invention is to provide a process and control system for collecting and processing temperature information from a rotary calcining kiln and for using that information to control the rotary calcining kiln operational variables for optimum operation.

SUMMARY OF THE INVENTION

According to one aspect of the invention, there is provided a process of controlling a rotary calcining kiln having a feed material inlet for material to be calcined, a calcined product outlet and a high temperature zone in which said material is calcined, said high temperature zone being movable within said rotary calcining kiln according to changes in operational control variables of the calcining kiln capable of affecting the position of the high temperature zone, which process comprises measuring temperatures within said calcining kiln at various positions spaced from each other along the calcining kiln, at least in a region overlapping a predetermined desired position for said high temperature zone, and adjusting at least one of said control variables to move said high temperature zone towards said desired position when said high temperature zone deviates from said desired position, wherein said temperatures are measured by thermocouples having thermocouple junctions protected from abrasion by a layer of heat and abrasion resistant material positioned within said rotary calcining kiln.

According to another aspect of the invention, there is provided a control system for a rotary calcining kiln having a feed material inlet, a calcined product outlet and a high temperature zone in which said material is calcined, said high temperature zone being movable within said rotary calcining kiln according to changes of operational control variables capable of affecting the position of said high temperature zone, which system comprises: a plurality of thermocouples provided within said rotary calcining kiln at various positions spaced from each other at least in a region overlapping a predetermined desired position of said high temperature zone, said thermocouples each comprising thermocouple junctions protected by a layer of heat and abrasion-resistant material; means for determining an actual position of said high temperature zone from signals from said thermocouples; and means for directing adjustment of said control variables to move said high temperature zone towards said predetermined desired position when said high temperature zone deviates from said desired position.

According to yet another aspect of the invention, there is provided a process of controlling a rotary calcining kiln having a feed material inlet for material to be calcined, a calcined product outlet, a kiln wall and a high temperature zone within the kiln in which said material is calcined, said high temperature zone being movable within said rotary calcining kiln according to changes in operational control variables of the calcining kiln capable of affecting the position of the high temperature zone, which process comprises: establishing a desired position for said high temperature zone within the kiln for the material to be calcined; operating said kiln and measuring temperatures of said material within the kiln at various positions spaced from each other along the kiln, at least in a region overlapping said desired position for said high temperature zone; monitoring an actual position of said high temperature zone within the kiln; and adjusting at least one of said control variables to move said high temperature zone towards said desired position when said actual position of said high temperature zone deviates from said desired position; wherein said temperatures are measured by detecting varying temperature signals from heat and abrasion resistant thermocouples extending through the kiln wall to contact said material in the kiln intermittenlty as the kiln rotates and calculating actual material temperatures from said varying temperature signals.

In the above process the actual temperature of the material at each thermocouple may be calculated by an equation as follows:

$$\frac{T_h(C) - T}{T_h(O) - T} = e^{(-t/ae^{-bT})}$$

wherein a and b are constants,

T is the temperature of a bed of the material in the kiln, $T_h(O)$ is the temperature of the thermocouple before it enters the material bed, $T_h(C)$ is the temperature of the thermocouple one or two cycles of rotation of the kiln after $T_h(O)$, and t represents time.

By the term "rotary calcining kiln" we mean a kiln or oven adapted for heating particulate materials to a high temperature at which calcination or another heat-induced physical or chemical change takes place.

By the term "high temperature zone" we mean a zone within the rotary calcining kiln in which calcination or other heat-induced physical or chemical change of the material takes place. The high temperatures within the high temperature zone thus include temperatures at which calcination or other heat-induced physical or chemical change takes place.

BRIEF DESCRIPTION OF THE DRAWINGS

FIG. 2 is an enlarged cross-section of part of the wall of the rotary calcining kiln of FIG. 1 in the region indicated by dotted line II, showing the positioning of thermocouples in accordance with a preferred embodiment of the present invention;

FIG. 3 is a transverse cross-section of the rotary calcining kiln of FIG. 1 showing various angles which are important for the control of the rotary calcining kiln;

DETAILED DESCRIPTION OF THE INVENTION

Figure 1:
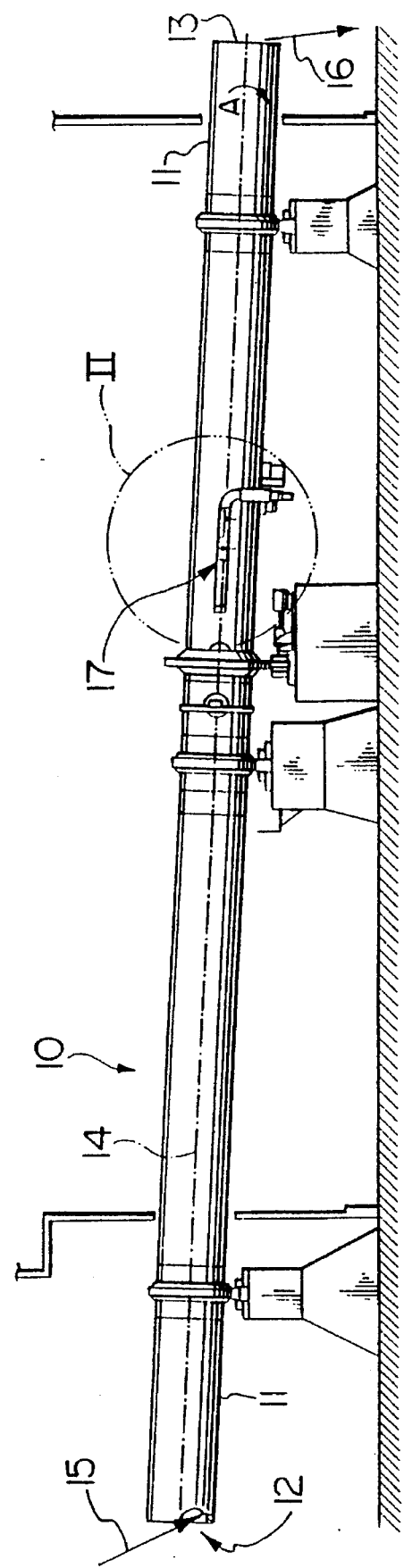
FIG. 1 is a schematic side elevation of a rotary calcining kiln employed in one preferred embodiment of the present invention.

FIG. 1 is a schematic illustration of a rotary calcining kiln 10 suitable, in this particular embodiment, for calcining green petroleum coke in accordance with a preferred process of the present invention, and FIG. 2 is an enlarged cross-section of part of the rotary calcining kiln wall in the region indicated by the dotted line II in FIG. 1.

The rotary calcining kiln comprises a refractory-lined hollow cylinder 11, often referred to as a "shell", arranged to slope downwardly from an upper feed inlet 12 to a lower discharge outlet 13. The rotary calcining kiln is preferably rotated slowly around its longitudinal axis 14 in the direction shown by arrow A. Green petroleum coke, represented by arrow 15, is introduced into the upper inlet 12 and calcined coke, represented by arrow 16, emerges from the lower outlet 13. The rate of throughput of the coke is determined by such factors as the angle of slope of the rotary calcining kiln relative to the horizontal (which is normally fixed), the rate of rotation of the rotary calcining kiln (which is capable of being varied, e.g. within the range of 1 to 3 r.p.m.) and the rate of feed of the green coke to the inlet 12.

A series of tuyeres 17 extends through the wall 11 in the region where the emission of volatiles from the coke is likely to be the highest, i.e. in the region of the calcination zone. These tuyeres 17 introduce air or oxygen into the rotary calcining kiln to enable the emitted volatile materials to burn within the rotary calcining kiln and thus to heat the incoming charge of green coke. The burning volatiles form a fireball (not shown) within the interior of the rotary calcining kiln. To start and maintain suitable operating temperatures, hot combustion gases may be introduced into the rotary calcining kiln near the outlet 13 via suitable equipment (not shown), but most of the heat required to calcine the coke following the start-up period is produced by the combustion of volatiles within the rotary calcining kiln. An optimum amount of air or oxygen should be introduced through the tuyeres in order to burn the appropriate amount of volatiles while avoiding significant combustion of the coke material. This can be achieved by calculation or by trial and error.

It is advantageous to control the rotary calcining kiln in such a way that the hottest zone of the coke charge (i.e. the high temperature or calcination zone) is kept at or near the position of the tuyeres 17. This not only ensures that air or oxygen is introduced where the discharge of volatiles is at a maximum, but also that the coke has an opportunity to "heat soak" and cool to a certain extent before the calcined product exits the rotary calcining kiln at outlet 13. The "heat soak" period (i.e. a period of time at which the coke remains at or above a certain minimum temperature (e.g. 1000° C.)) advantageously increases the average crystal length $L_c$ of the calcined coke, and the subsequent cooling of the coke within the rotary calcining kiln reduces losses to combustion when the product 16 enters the open atmosphere. For these reasons, the position of the tuyeres is chosen to be a suitable distance from the outlet 13, e.g., about one third of the overall length of the rotary calcining kiln.

As shown in FIG. 2, in order to make it possible to control the calcination process with precision, a series of preferably six thermocouples $Th_1$, $Th_2$, $Th_3$, $Th_4$, $Th_5$ and $Th_6$ is positioned along the inside surface 18 of the rotary calcining kiln wall 11 spanning the region where the tuyeres 17 enter the rotary calcining kiln in order to detect the temperature of the coke in this region. The thermocouples are separated from each other by distances $\Delta X_1$, $\Delta X_2$, $\Delta X_3$, $\Delta X_4$, and $\Delta X_5$, which distances are preferably each in the range of 1.5 to 5.5 m, depending on the specific design of the rotary kiln.

FIG. 3 is a transverse cross-section of the rotary calcining kiln showing coke charge 20 which, due to the rotation of the rotary calcining kiln in the direction of the arrow A, is positioned off-center at the bottom of the rotary calcining kiln 10 and has an upper surface 21 sloping generally at an angle $\phi$ to the horizontal. This angle $\phi$ is referred to as the dynamic friction angle of the coke and is important because it can be used as an indication of the position of the calcination zone within the rotary calcining kiln of the coke. As mentioned earlier, in the calcination zone, the evolution of volatiles is so voluminous that the coke particles become at least partially fluidized and they exhibit less friction with each other. Consequently, the dynamic friction angle $\phi$ is reduced (normally to about 15°–25°) compared to the dynamic friction angle (normally about 35°–45°) in other parts of the coke charge 20. The angle $\phi$ can be found from the temperatures measured by the thermocouples $Th_1$–$Th_6$ and the thermocouples should be positioned to span the region where $\phi$ is desired to be a minimum. The calculation of $\phi$ is explained later in this disclosure.

As indicated above, one aspect of the process of the present invention relies for its success on the ability to obtain temperature information from within the rotary calcining kiln on a reliable and rapid basis. This has been made possible by the provision of thermocouples capable of withstanding the harsh conditions which prevail within the rotary calcining kiln, i.e. high temperature and high degrees of abrasion, for acceptable lengths of time even though the tips of sheaths protecting the thermocouples come into direct contact with the coke bed.

Figure 4:
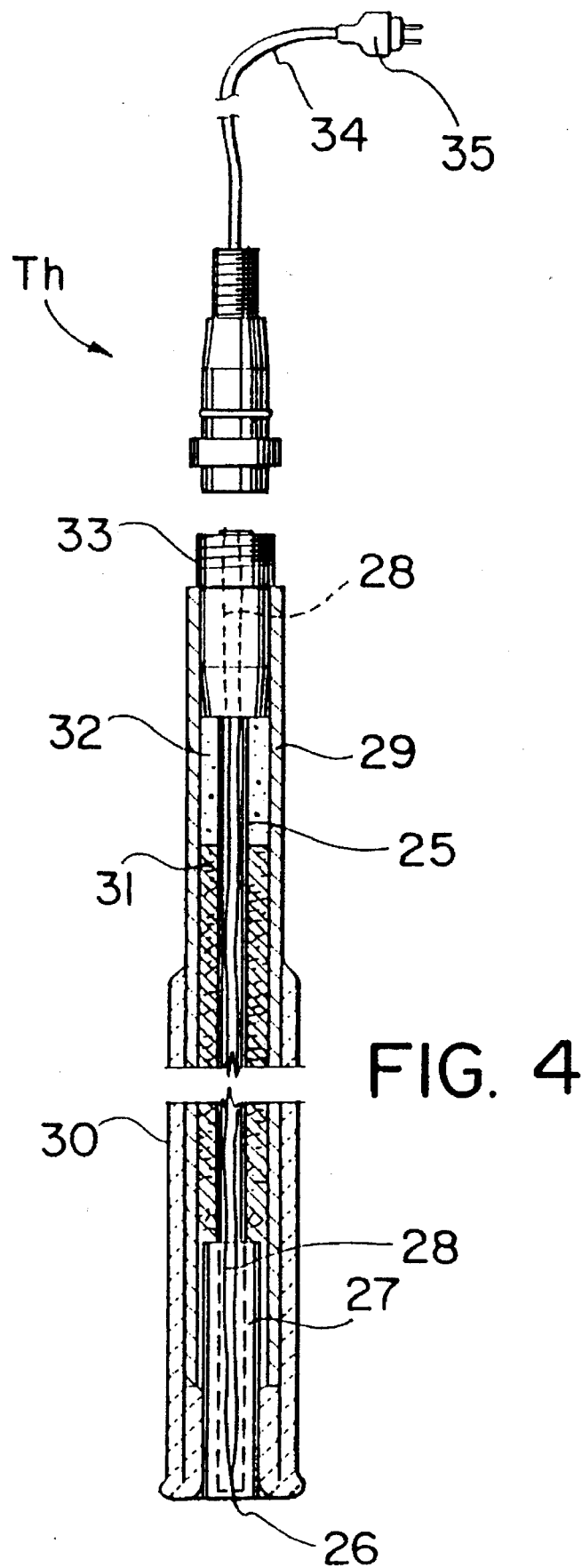
FIG. 4 is a longitudinal cross-section of a preferred thermocouple unit used in one embodiment of the present invention.

A preferred thermocouple unit Th of this type is shown in FIG. 4, which illustrates the unit in longitudinal cross-section. At its lower end, thermocouple unit Th is provided with a thermocouple junction 26, preferably one which is resistant to high temperatures, for example a platinum-based thermocouple junction. A particularly preferred thermocouple is one containing a B-type platinum-platinum rhodium junction. The thermocouple junction 26 is positioned within a protective solid sheath 27 made of ceramic material that is sufficiently hard and shock resistant to protect the junction 26 from abrasion and damage in the rotary calcining kiln interior. The ceramic material should preferably, however, also be sufficiently heat-conductive to avoid undue heat insulation of the thermocouple junction 26, which would reduce the response time of the thermocouple unit to temperature changes. It has been found that a ceramic material having a good combination of mechanical and thermal properties is a sintered or heat-treated alumina/silicon carbide ceramic material, particularly one made from a mixture of alumina powder and about 5 to 50% by volume, more preferably 10 to 30% by volume, of SiC particles. The alumina particles are preferably sub-micronic in size, while the particles of SiC are preferably 5 μm to 60 μm in average diameter. It is believed that the SiC particles reinforce the alumina matrix against shocks and provide the ceramic material with high thermal conductivity. However, other hard ceramic materials having the desired properties may be used, particularly ceramic particle reinforced ceramic matrix composites.

The alumina/SiC ceramic material mentioned above can be formed by uniaxial hot-pressing an homogeneous alumina/SiC mixture, preferably in a graphite die, at a temperature in the range of 1450°–1700° C., preferably about 1500° C., under a pressure of 4000–8000 p.s.i., preferably about 6000 p.s.i., for a period of time of 0.5 to 2 hours, preferably about 1 hour, under an atmosphere of argon or other unreactive gas. This procedure is capable of producing a nearly pore-free block of the ceramic material. While the actual hardness of sheaths produced in this way has not been measured, tests have shown very little abrasion after ten months of use in a rotary coke calcining kiln, indicating that the durability of the sheath is at least one year for the preferred materials.

As an alternative, the homogenous alumina/SiC mixture may be cold pressed and sintered to form a similar abrasion-resistant body.

When the process by which the ceramic material is formed involves uniaxial hot-pressing, it is found that it is especially advantageous to use silicon carbide in the form of platelets rather than generally spherical particles. Platelets, which are usually single crystals of SiC, have large length and width dimensions compared to the thickness dimension, and uniaxial pressing tends to align all of the platelets in the same direction. This greatly improves the mechanical and thermal properties of the resulting material and can result in ceramics capable of withstanding temperatures as high as 1600° C. in both oxidizing and reducing atmospheres. Ideally, the platelets have lengths and widths in the range of 5–60 μm and thicknesses in the range of 1–10 μm. Thus their average size in two dimensions is within the 5–60 μm range, but may be outside of this range in the third dimension.

Suitable SiC platelets may be obtained, for example, from Third Millenium Technologies, Inc, of Knoxville, Tenn. or may be produced according to the process of commonly-assigned U.S. Pat. No. 5,258,170 issued Nov. 2, 1993, the disclosure of which is incorporated herein by reference. Suitable alumina particles are commercially readily available from many sources.

The sheath 27 may be formed directly around the thermocouple junction 26 or may be formed separately as a block provided with an axial blind bore open at one end for insertion of the thermocouple junction and connecting wires. While the hot pressed alumina/SiC material is so hard that it is impractical to form the blind bore by drilling once the solid block has been produced, the bore can be created by forming the ceramic powder mixture around a carbon rod, subjecting the powder to sintering or hot-pressing and then drilling or burning the carbon rod away at high temperature in oxidizing conditions, e.g. by heating the sheath in air at a temperature of at least 700° C. and no more than 900° C. for 24 hours. After such a treatment, there is no trace of carbon remaining in the sheath.

Figure 5:
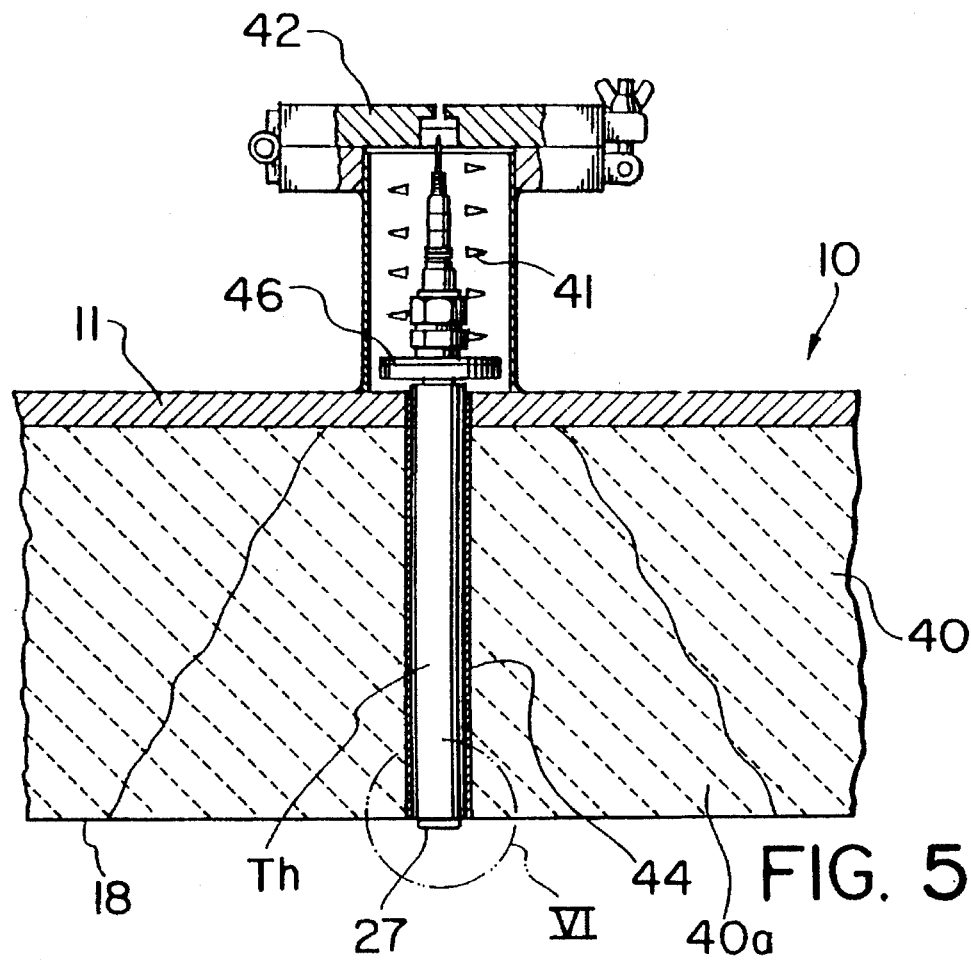
FIG. 5 is an enlarged cross-section of a wall of a rotary calcining kiln, such as the one shown in FIG. 1, having a thermocouple of the type shown in FIG. 4 mounted therein.
Figure 6:
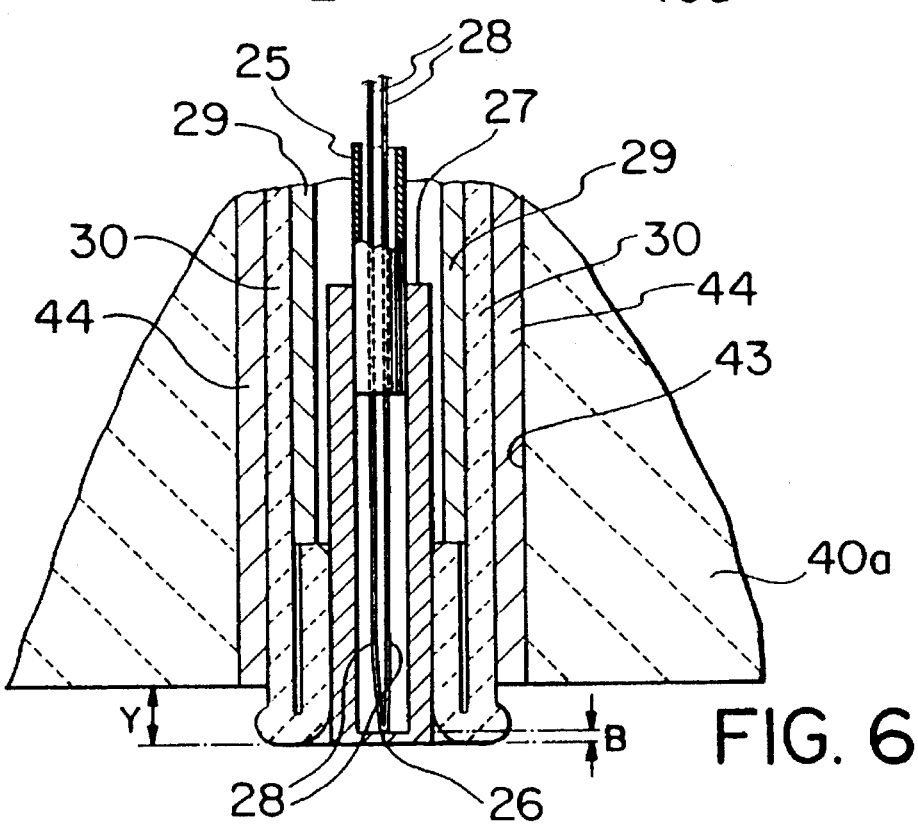
FIG. 6 is an enlarged cross-section of the region indicated by dotted line VI in FIG. 5.

FIG. 5 is a cross-section of part of the wall 11 of the rotary calcining kiln 10 showing the position of one of the thermocouple units Th, and FIG. 6 is an enlarged cross-section of the extreme inner end of the thermocouple unit Th in the region indicated by circle VI in FIG. 5.

The thermocouple junction 26 should be separated from the end face of the sheath 27 exposed in use to the interior of the rotary calcining kiln by a thickness of ceramic material preferably in the range of 2 to 10 mm, and more preferably 2 to 3 mm. This thickness is shown in FIG. 6 as distance B. Such thicknesses are adequate for providing good shock and abrasion resistance, without unduly affecting the thermal sensitivity of the thermocouple junction 26 (depending on the thermal conductivity of the sheath material).

The connecting wires 28 for the thermocouple junction 26 extend through a heat-insulating tube 25 surrounded by an alumina tube 29 having a protective outer jacket 30, made for example of ceramic fiber, at its lower region. The alumina tube 29 and the protective jacket 30 are open at their lower ends as shown to allow direct contact between the extreme end of the sheath 27 and the contents of the rotary calcining kiln. In fact, in use, the end of the sheath projects for a short distance into the rotary calcining kiln interior, (distance Y in FIG. 6), usually by an amount in the range of 5 mm to 1 cm from the surrounding inner surface of the rotary calcining kiln insulation 40. This distance allows the sheath to penetrate into the coke charge 20 far enough to provide good temperature sensing, but is small enough to minimize damage to the sheath 27 caused by impact with coke particles, abrasion and shocks. On the opposite side of the sheath 27, the alumina tube 29 is filled with a ceramic wool 31 for heat insulation and then, near the upper end, with a cement 32 for sturdiness. The extreme upper end of the tube 29 is fitted with a rapid electric connector 33 for attachment to a connection cable 34, which terminates in an electrical plug 35.

The thermocouple unit Th extends from the outside of the rotary calcining kiln wall 11 through the layer of refractory insulation 40 in a through hole 43 provided with an alumina liner 44. To position the sheath, the original inner lining 40 may be broken away, the thermocouple and the liner 44 positioned appropriately, and the surrounding space re-filled with a castable refractory material 40a. of the same composition as the original At its outer end, the thermocouple unit is protected by a sturdy hinged cover arrangement 42 securely attached, e.g. by welding, to the rotary calcining kiln wall 11. The thermocouple unit Th is held in place by a coil spring 45 extending between the hinged cover 42 and an enlarged outer end 46 of the thermocouple unit Th. The coil spring enables the thermocouple unit to move temporarily outwardly through the alumina tube 44 when the sheath 27 is struck by heavy particles in the rotary calcining kiln interior, thus offering further protection against mechanical shocks. The hinged cover arrangement 42, which is provided with a recess for the thermocouple cable, makes rapid replacement of the thermocouple unit possible since all that has to be done is to open the cover, remove the coil spring 45, withdraw the old thermocouple unit Th and replace it with a new thermocouple unit, followed by repositioning of the coil spring 45 and closing of the lid 42. This ease of replacement is a considerable advantage because the thermocouple units of the invention, while being capable of resisting the harsh operational conditions for an adequate period of time, e.g. at least one year even in the calcination zone, do need to be replaced from time to time and the illustrated mounting arrangement ensures that the rotary calcining kiln will be inoperable for the minimum period of time when such replacement is required.

While the thermocouple units described above are intended specifically for use in petroleum coke rotary calcining kilns, they can of course be used for other industrial high temperature systems (e.g. those operating at temperatures above 1100° C.) which expose the thermocouples to abrasion and thus present premature failure risks. Examples include alumina rotary calcining kilns, cement furnaces, red mud rotary calcining kilns, dross treatment plasma furnaces, anode baking furnaces and electric arc furnaces for treating anthracite.

Figure 7:
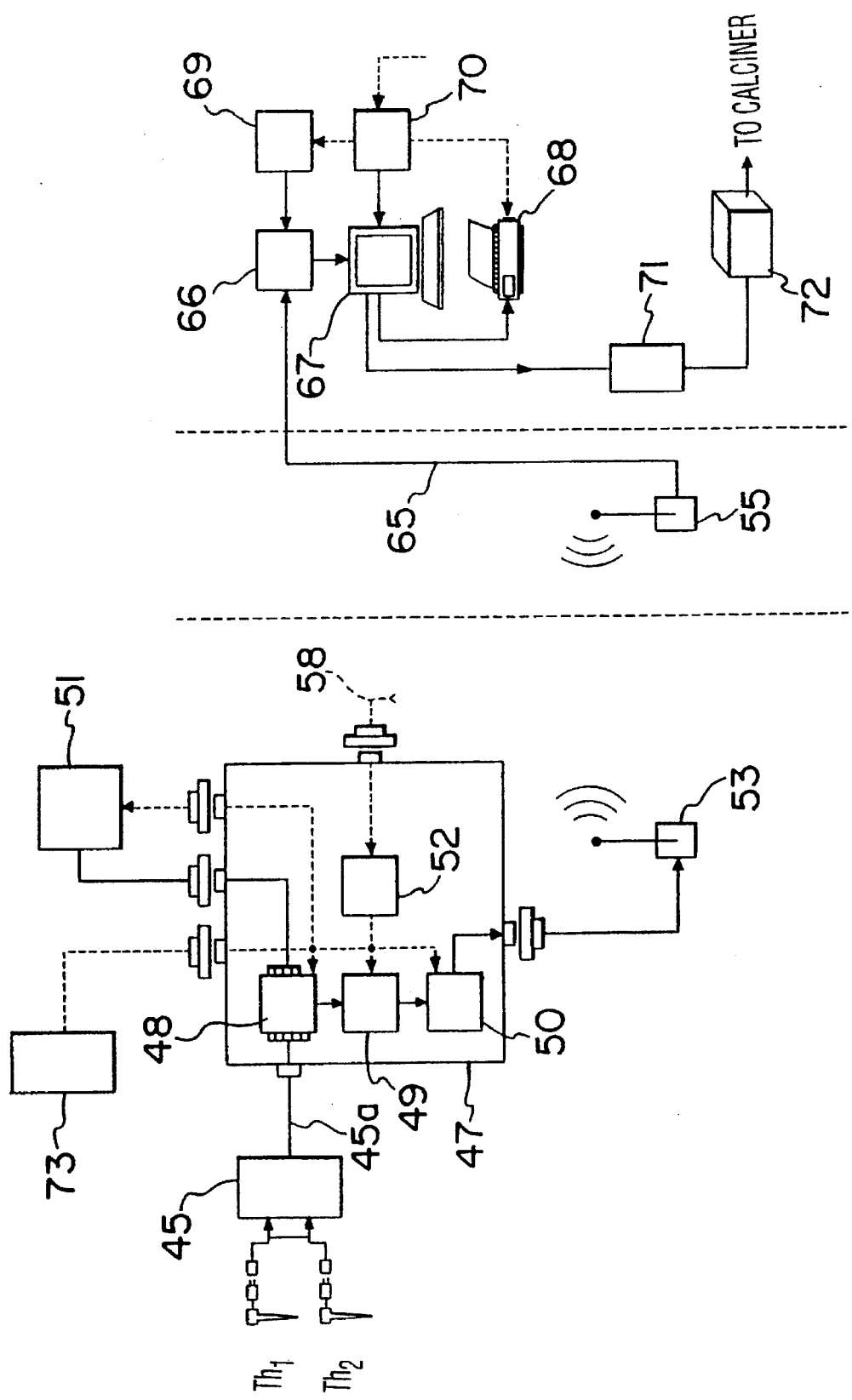
FIG. 7 is a schematic diagram of the circuitry used to measure and record the temperatures from the thermocouple units and to calculate therefrom the values used to control the rotary calcining kiln.

The thermocouple units Th are preferably connected to recording and control equipment in the manner shown in FIG. 7. The thermocouple units Th themselves are of course mounted directly in the rotating shell of the rotary calcining kiln and are connected via heat-resistant cables to a junction box 45, also mounted on the shell. A single heat-resistant output cable 46 from the junction box 45 carries the signals from all of the thermocouple units to a unit 47 also mounted on the rotary calcining kiln shell. The unit 47 contains an analog input/output device 48 which gathers data not only from the thermocouple units Th, but also from a device 73 for measuring the tertiary air flow rate to the tuyeres 17 of the rotary calcining kiln and a device 51 for measuring the angle of rotation of the rotary calcining kiln (which is also used to measure rotational speed). The signals from these devices are fed to a communication module 49 and from there to an RF modem 50 and to a communication antenna 53. The unit 47 is powered by an AC/DC transformer/rectifier 52 supplied with AC current from an external source (not shown) via slip rings 58.

The antenna 53 makes it possible to transmit the signals from the various devices mounted on the rotary calcining kiln to stationary equipment at a control station, which may be in a different room or building from the rotary calcining kiln. The signals are received by transceiver 55 and are fed via cable 65 to an RF modem 66 for conversion to electrical signals suitable for delivery to a computer 67. The modem 66 is powered by a low voltage supply unit 69 connected to AC electrical current via a voltage filter 70 to eliminate line noise. A printer 68 is provided to record output from the computer 67 and output can also be fed via a computer communication adapter 71 to a programmable logic controller 72 for control of the process which sends control signals to control equipment (not shown) on the rotary calcining kiln, e.g. a speed control for rotation of the rotary calcining kiln, means for feeding green coke to the rotary calcining kiln and fan means for delivering tertiary air to the tuyeres 17.

The temperatures measured by the thermocouple units $Th_{1-6}$ are preferably sampled at periods of time between 1/3 and 2 seconds. For each thermocouple unit $Th_{1-6}$, the steps to be followed are as follows:

(1) For each cycle (t=c), the temperature of each thermocouple unit $Th_{1-6}$ is measured, as well as the angle $\phi_1$ to $\phi_6$.

(2) The temperature of the coke is then calculated using the following equation:

$$\frac{T_h(C) - T_{coke}}{T_h(O) - T_{coke}} = e^{(-t/ae^{-bT_{coke}})}$$

wherein a and b are constants determined as indicated below, $T_{coke}$ is the temperature of the coke bed, $T_h(O)$ is the temperature of the thermocouple before it enters the coke bed, $T_h(C)$ is the temperature of the thermocouple one or two cycles after $Th_h(O)$, and $T_h(t)$ is the temperature of the thermocouple at time t.

A computer can be used to find $T_{coke}$ from the above equation.

The constants a and b are determined as indicated by the following equations:

$$\frac{T_h(t) - T_{coke}}{T_h(O) - T_{coke}} = e^{-t/\tau} = e^{-t/ae^{-bT_{coke}}}$$

1. $T_h(O) \cong 1273°$ C., $\theta = 287.2°$
   $T_h(t) \cong 1266.6°$ C., $\theta = 310.9°$
   $\Delta\theta = 23.7°$ $$T_{coke} \cong 1262° C., t = (60 s)(2.1 \text{ RPM}) \left(\frac{23.7°}{360°}\right) = 8.29 s$$

Then expressing the measured temperatures in °K.

$$\frac{1539.6 - 1535}{1546 - 1535} = e^{-8.29/\tau}$$

$$\boxed{\tau = \frac{-8.3}{\ln(0.41818)} = 9.52 s} \quad (1)$$

2. $T_h(O) \cong 1272°$ C., $\theta = 291.8°$
   $T_h(t) \cong 1265.9°$ C., $\theta = 317.3°$
   $\Delta\theta = 25.5°$ $$T_{coke} \cong 1262.5° C., t = (60 s)(2.1 \text{ RPM}) \left(\frac{23.7°}{360°}\right) = 8.93 s$$

Then expressing the measured temperatures in °K.

$$\frac{1538.9 - 1535.5}{1545.0 - 1535.5} = e^{\frac{-8.93}{\tau}}$$

$$\boxed{\tau = \frac{-8.93}{\ln(0.357)} = 8.69 s} \quad (2)$$

To find a and b:

$$\tau = ae^{-bT_{coke}}$$

From (1) and (2) it is possible to find:

$$9.52 = ae^{-b1535}$$

$$8.69 = ae^{-b1535.5}$$

The solution is as follows:

$$\ln a = \frac{\left(\frac{\ln 9.52}{1535}\right) - \left(\frac{\ln 8.69}{1535.5}\right)}{\left(\frac{1}{1535}\right) - \left(\frac{1}{1535.5}\right)}$$

$$\boxed{a = 282.304}$$

and by substitution:

$$\boxed{b = 2.2082 \times 10^{-3}}$$

For the third thermocouple from the outlet end ($Th_3$) for example:

$$\frac{T_h(t) - T_{coke}}{T_h(O) - T_{coke}} \cong e^{-t/(282.3e^{-2.208 \times 10^{-3} T_{coke}})} \quad (3)$$

Examples of coke temperature estimation

1) For a particular thermocouple, say thermocouple $Th_3$ from the inlet end:

$T_h(O) = 1273.8°$ C.

t=9.73 s (2 sampling cycles)

$T_h(t) = 1270.9°$ C.

with equation (3) it is possible to find:

$T_{coke} \cong 1269.3°$ C.

The measurement is (estimated):

$T_{measurement} \cong 1267.5°$ C.

2) For thermocouple $Th_3$:

$T_h(O) = 1280.5°$ C.

$T_h(t) = 1261.07°$ C.

t=10.214 s (2 sampling cycles)

with equation (3) it is possible to find:

$T_{coke} = 1250.5°$ C.

The measurement is (estimated):

$T_{measurement} = 1251.5°$ C.

The error is small $\cong 1°$ C.

(3) The friction angle is calculated using the following equation, using the angles as shown in FIG. 3:

$$\phi = \frac{\Gamma}{2} - \alpha$$

$$\alpha = 270° - \theta\downarrow$$

then $$\Gamma = \frac{\theta\uparrow + \theta\downarrow}{2} - 270°$$

Wherein $\theta\uparrow$ and $\theta\downarrow$ are, respectively, the rotary calcining kiln angles $\theta$ as shown in FIG. 3 when the thermocouple leaves and enters the coke bed, respectively (as indicated by the signals from the thermocouple).

(4) After having found for each of the six thermocouples:

$T_{coke1}, \phi_1$ $T_{coke2}, \phi_2$ $T_{coke3}, \phi_3$ $T_{coke4}, \phi_4$ $T_{coke5}, \phi_5$ $T_{coke6}, \phi_6$ a graph can then drawn, e.g. by the computer, of $T_{coke}$ as a function of the location X of the thermocouple in the rotary calcining kiln, providing a visual indication of the temperature profile. Such graphs show that the temperatures measured increase the further the thermocouple is located down the kiln, towards the outlet end.

(5) The calcining zone can be found by using the minimum of the $\phi$ values. The location of $\phi_{minimum}$ indicates where the coke bed is fluidized and this corresponds to the calcination zone. A second order polynomial function is fitted for $\phi$ function of X and with the first derivative of $$\frac{d\phi}{dX} = 0$$

and find $\phi_{minimum}$.

Figure 8A:
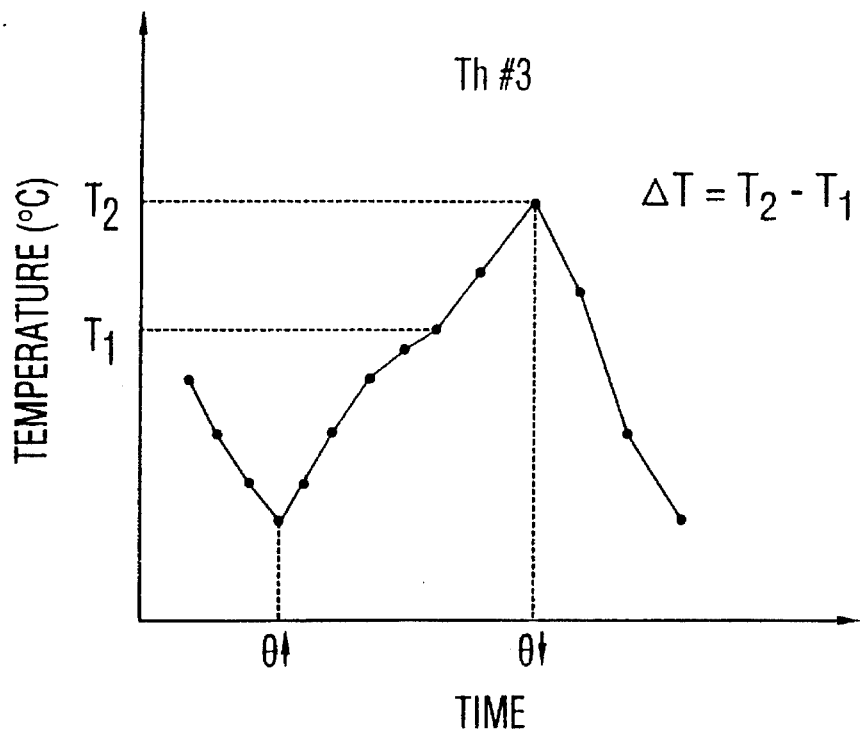
FIGS. 8(A), and 8(B) are examples of graphs calculated from the temperatures measured by the thermocouple units.

In order to detect the location of the fireball, if this is desired, the following calculation is carried out for each thermocouple:

(6) The typical form of the thermocouple output before and after the thermocouple enters the coke bed is plotted, as shown in FIG. 8(A).

(7) The value for $\Delta T$ is calculated as $\Delta T = T_2 - T_1$.

Figure 8B:
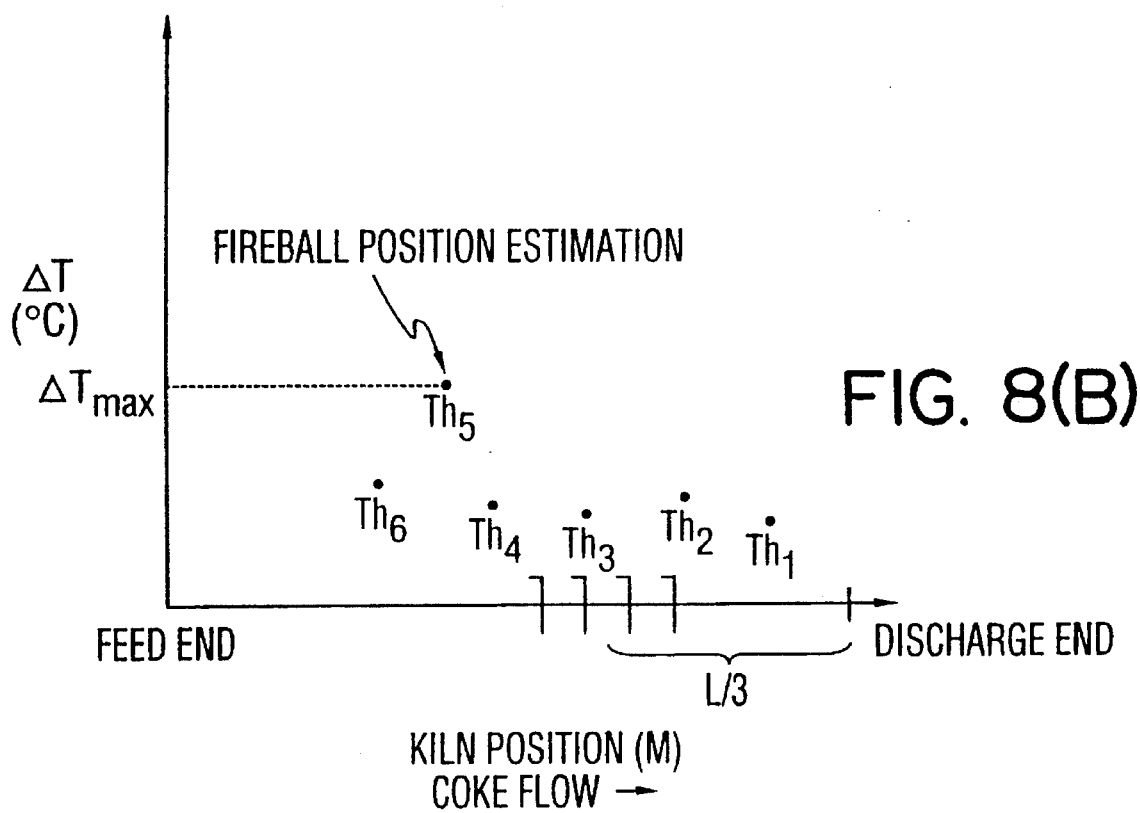

(8) A graph of $\Delta T$, as shown in FIG. 8(B), is plotted against location X in the rotary calcining kiln and the position of the maximum value $\Delta T_{max}$ indicates the position of the fireball.

(9) From two $T_{coke}$ values, preferably $T_{coke1}$ and $T_{coke4}$, the average crystallinity of the calcined coke can be estimated "on line" by using an equation of the form:

$$L_c = e^{(aT_{coke1} + bT_{coke4} + c)}$$

wherein $L_c$ is the average crystal length in Å

$T_{coke1}$ is the coke temperature (°C.) estimated at thermocouple1

$T_{coke4}$ is the coke temperature (°C.) estimated at thermocouple4

The constants a, b and c are evaluated from a least square fitting from a set of 1 to 8 values of $L_c$, $T_{coke1}$, $T_{coke4}$, previously measured.

(10) A new $L_c$ is evaluated in a laboratory after a period of time (2 to 24 hours depending on the stability of the rotary calcining kiln) then a new set of $L_c$, $T_{coke1}$, $T_{coke4}$, is recorded in the computer database dB analog.

(11) The new set of values is used to update the constants a, b and c.

Accordingly, it is possible by following the above steps to do the following:

evaluate the temperature of the coke (steps 1 and 2)

evaluate the dynamic friction angle of the coke (step 3)

evaluate the coke temperature profile (step 4)

evaluate the location of the calcination zone (step 5)

evaluate the location of the fireball (steps 6, 7 and 8)

evaluate the crystalline length of the calcined coke (steps 9, 10 and 11).

Using computer 67, steps 1 to 11 are repeated every 1 to 12 completed rotations of the rotary calcining kiln (depending on the cycle) and outputs, are displayed on the screen of the computer and, if required, printed out on printer 68.

Figure 9A:
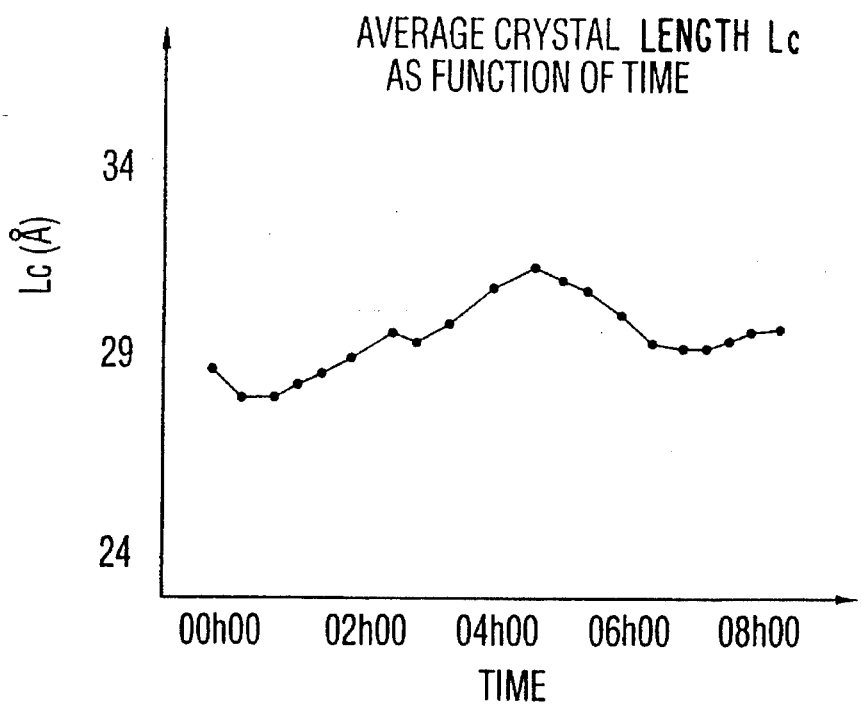
FIGS. 9(A), and 9(B) are examples of graphs displaying various conditions existing inside the rotary calcining kiln calculated from the temperatures measured by the thermocouple units.

FIG. 9(A) shows the average crystal length $L_c$ values calculated from the thermocouple readings, over a period of 8 hours. Note that the values have been maintained between 28.5 and 31.

Figure 9B:
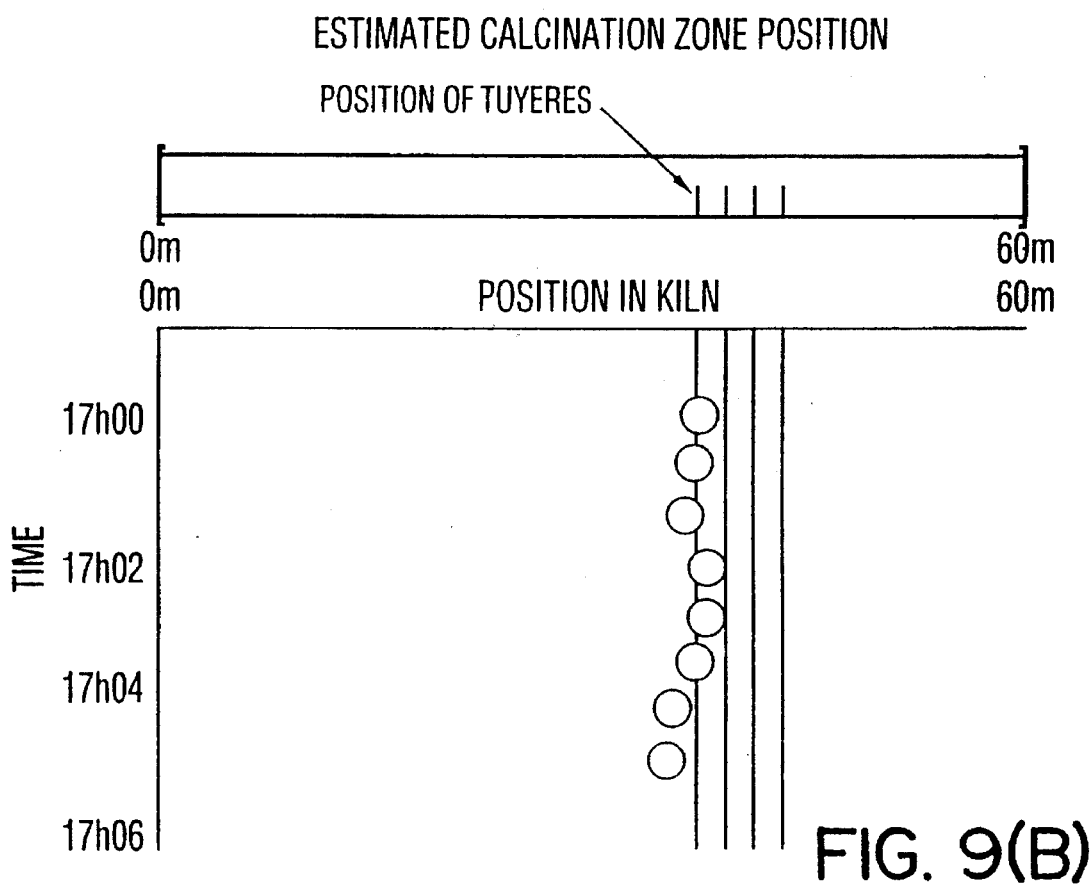

FIG. 9(B) shows the position of the calcination zone in the kiln over a period of 30 minutes. The position of the zone is calculated from the thermocouple readings. Note that over this period, the zone was maintained at the position of the uppermost tuyere in the kiln.

The speed of rotation of the rotary calcining kiln, the tertiary air flow rate to tuyeres 17, and the feed of material to the rotary calcining kiln are operational control variables which can be adjusted to maintain optimum conditions, as explained in the following.

Manual and automatic computer control of the coke rotary calcining kiln can be brought about most effectively by the use of the following algorithm to govern the variation of the operational control variables.

Optimal control of the rotary calcining kiln is based on two precise elements carried out in the following order of importance:

1. Maintain the position of the calcination zone in a predetermined desired position, e.g. just ahead of the first tuyere used for the introduction of tertiary air. This position is referred to as $Z_{target}$ (m) and its actual value depends on the rotary calcining kiln design.

2. Determine the desired average crystal length of the calcined coke, referred to as $L_{Ctarget}$ (Å). The usual target crystal length of the calcined coke is 29–31 Å, whereas the green coke used as the starting material usually has an average crystal length of about 15 Å.

These desirable parameters are affected by the following three operational control variables presented in order of decreasing importance:

1. The rate of flow of tertiary air, referred to as $M_{3air}$ (m³/min.).

2. The rate of rotation of the rotary calcining kiln, referred to as $R_{sp}$ (rpm).

3. The rate of delivery of green coke, referred to as $G_{coke}$ (tonne/hour).

Other possible variables which can be controlled are not considered because their effects have not been well identified.

The observed effects of the control variables are as follows:

1. The rate of flow of tertiary air $M_{3air}$ $$\Delta Z = \alpha \Delta M_{3air} \qquad \alpha = -(0.2154 +/- 0.1077) \qquad (1)$$

$$\Delta L_c = \beta \Delta M_{3air} \qquad \beta = 0.1091 \frac{R_{sp}^{0.2356} G_{coke}^{0.8180}}{M_{3air}^{0.8909}} \qquad (2)$$

wherein Z is the position of the calcination zone in meters from the feed inlet.

2. The speed of rotation of the rotary calcining kiln, $R_{sp}$ a) if $\Delta R_{sp} > 0$ $$\Delta Z = \gamma \Delta R_{sp}, \gamma = 9[0 \text{ to } \frac{1}{2} \text{ hour}] \qquad (3)$$

$$\gamma = -12[\frac{1}{2} \text{ to } 1 \text{ hour}] \qquad (4)$$

$$\gamma = -3[>1 \text{ hour}] \qquad (5)$$

(positive values represent distances downhill in meters from the feed inlet).

$$\Delta L_c = \xi \Delta R_{sp} \qquad \xi = 0.2356 \frac{M_{3air}^{0.1091} G_{coke}^{0.8180}}{R_{sp}^{0.7644}} \quad (6)$$

b) if $\Delta R_{sp} < 0$ $$\Delta Z = \gamma \Delta R_{sp} \qquad \gamma = 17[0 \text{ to } \tfrac{1}{2} \text{ hour}] \quad (7)$$
$$\gamma = -19[\tfrac{1}{2} \text{ to } 1 \text{ hour}] \quad (8)$$
$$\gamma = -2[>1 \text{ hour}] \quad (9)$$

$$\Delta L_c = \xi \Delta R_{sp} \qquad \xi = 0.2356 \frac{M_{3air}^{0.1091} G_{coke}^{0.8180}}{R_{sp}^{0.7644}} \quad (10)$$

These equations show that the speed of rotation of the rotary calcining kiln affects the average crystal length $L_c$ of the calcined coke, and that $L_c$ is also affected by the maximum temperature to which the coke is exposed and the "soaking time" i.e. the length of time the coke remains above a certain temperature after exiting the calcination zone. The values of $L_c$ can be measured for coke exiting the rotary calcining kiln and adjustments made if necessary "on line".

3. The rate of feed of green coke:

a) if $\Delta G_{coke} > 0$ $$\Delta Z = \delta \Delta G_{coke} \qquad \delta = 6.6[0 \text{ to } \tfrac{1}{2} \text{ hour}] \quad (11)$$
$$\delta = -7[\tfrac{1}{2} \text{ to } 1 \text{ hour}] \quad (12)$$
$$\delta = -0.4[>1 \text{ hour}] \quad (13)$$

$$\Delta L_c = \kappa \Delta G_{coke} \qquad \kappa = 0.8180 \frac{M_{3air}^{0.1091} R_{sp}^{0.2356}}{G_{coke}^{0.1820}} \quad (14)$$

b) if $\Delta G_{coke} < 0$ $$\Delta Z = \delta \Delta G_{coke} \qquad \delta = 7.2[0 \text{ to } \tfrac{1}{2} \text{ hour}] \quad (15)$$
$$\delta = -8[\tfrac{1}{2} \text{ to } 1 \text{ hour}] \quad (16)$$
$$\delta = -0.8[>1 \text{ hour}] \quad (17)$$

$$\Delta L_c = \kappa \Delta G_{coke} \qquad \kappa = 0.8180 \frac{M_{3air}^{0.1091} R_{sp}^{0.2356}}{G_{coke}^{0.1820}} \quad (18)$$

All of the numerical values of the constants of the equations (1) to (18) above are adjusted as required for new sources of green coke or for other reasons. The calculation carried out automatically by computer upon utilizing the latest recorded information.

The strategy for the normal operational control of the rotary calcining kiln is based on the position of the calcination zone and the average crystal length of the calcined coke.

1. The position of the calcination zone can be represented by five states, as indicated in the following:

```
   |          |         0        |          |
Very |  -8m   |  -4m | +4m |  +8m  |  Very
High |  High  |   Target   |      Low    |  Low
                  Z_target
|--------------------------------------- tuyeres ------>
Green coke feed end                  | | | | discharge
                                              end
```

Thus, the five states for the position of the calcination zone are: Very High (VH), High (H), On Target (T), Low (L) and Very Low (VL).

2. The average crystal length of the calcined coke has five observable states:

```
   |          |         0        |          |
   |  -4.0Å   |  -2.0Å |  +1.0Å |  +2.0Å   |
Very Low  Low        Target       High    Very High
                  L_Ctarget
|--------------------------------------------------->
26Å                                              32Å
```

Thus, the five states for the average crystal length $L_c$ are: Very Low (VL), Low (L), On Target (T), High (H) and Very High (VH).

There are thus 9 meaningful combinations of states for the position of the calcination zone and the average crystal length of the calcined product. These nine states, and the variables which influence them are set out in the following table:

TABLE 1

| State of the rotary calcining kiln | Z (m) | $L_c$ (Å) | $M_{3air}$ (m³/min.) | $R_{sp}$ (rev./min.) | $G_{coke}$ (tonnes/h.) | Time Constant (h) |
|---|---|---|---|---|---|---|
| | | | Principal Control Variables | | | |
| 1 | H | H | − | + | | 1 |
| 2 | H | T | − | | | ¼ to ½ |
| 3 | H | L | − − | + | | 1 |
| 4 | T | H | − | | | ¼ to ½ |
| 5 | T | T | | | + | ½ to 1 |
| 6 | T | L | + | | | ¼ to ½ |
| 7 | L | H | + + | − | | 1 |
| 8 | L | T | + | | | ¼ to ½ |
| 9 | L | L | + | − | | 1 |

Symbols used in the Table:
H: High
T: Target
L: Low
−: reduce the variable by Δ, estimated from fuzzy logic controller (FLC)
− −: reduce the variable by Δ, estimated from FLC
+: increase the variable by Δ, estimated from FLC
+ +: increase the variable by Δ, estimated from FLC.

The value of Δ is computed according to the Fuzzy Logic Based Rule Program.

The control logic is based on the following:

1. The condition of the rotary calcining kiln is determined to create an average for Z and $L_c$ over the period of the time constant,
2. A single new control action is carried out after the period of time of the time constant associated with the state of the rotary calcining kiln as long as the calcining temperature is within a certain range (1300° to 1340° C.).
3. If, after the time constant following a control action, the rotary calcining kiln is in the same condition, the control action is carried out again.
4. If the calcining temperature $T_c$ is out of that range (1300° to 1340° C.), the kiln is controlled with nine new Fuzzy Rules which are based on the feed end temperature ($T_{ct}$) and calcining temperature ($T_c$) and the discharge end temperature ($T_s$).

The control algorithm in the manual mode is put into practice as follows. The operator of the rotary calcining kiln notes the $\Delta Rsp$, $\Delta M_{3air}$ control variables from the computer screen generated by the Fuzzy Logic Controller and makes the necessary changes manually to the control equipment.

Figure 10:
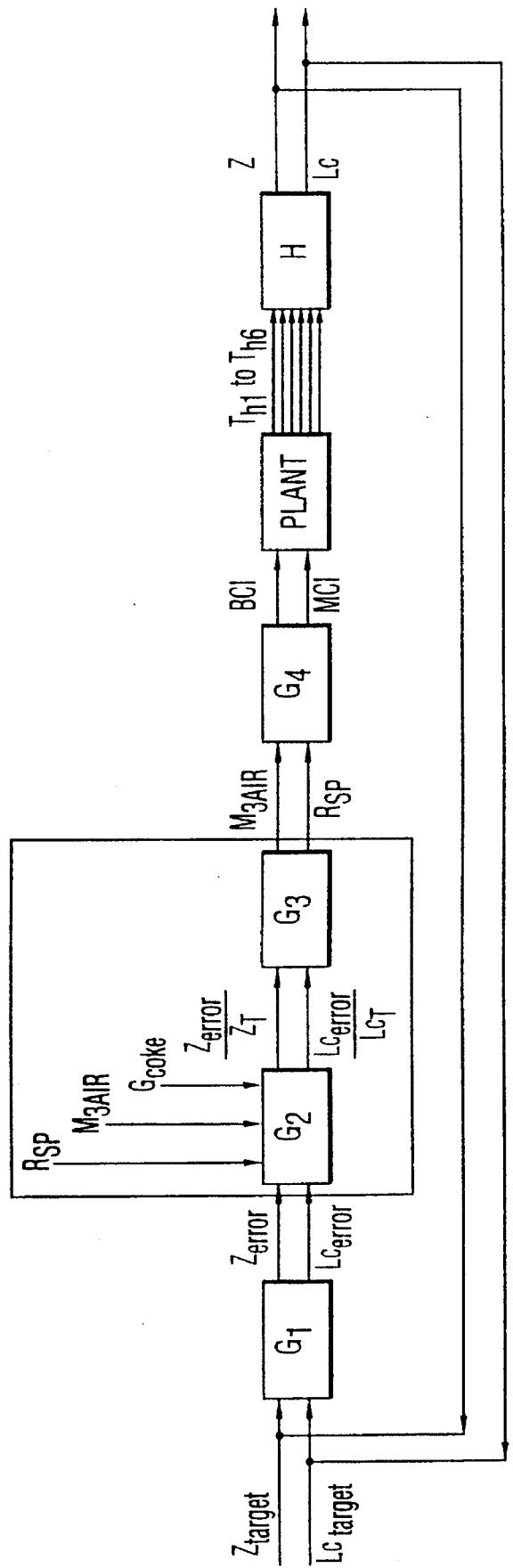
FIG. 10 is a control block diagram illustrating an operator/machine interface used in the process of the invention.

The control algorithm in the automatic mode operates as follows. The computer which applies the control algorithm is connected, for example, to the Programmable Logic Controller (PLC) (e.g. a TI- PM550). The control action is then applied to the instruments (MCI, BCI). The operator may return to manual control at any time and for any reason (e.g. problems with the equipment, particular procedures, and the like). The control is of the adaptive feedback control type. The operator/machine interface is shown in FIG. 10.

Figure 15:
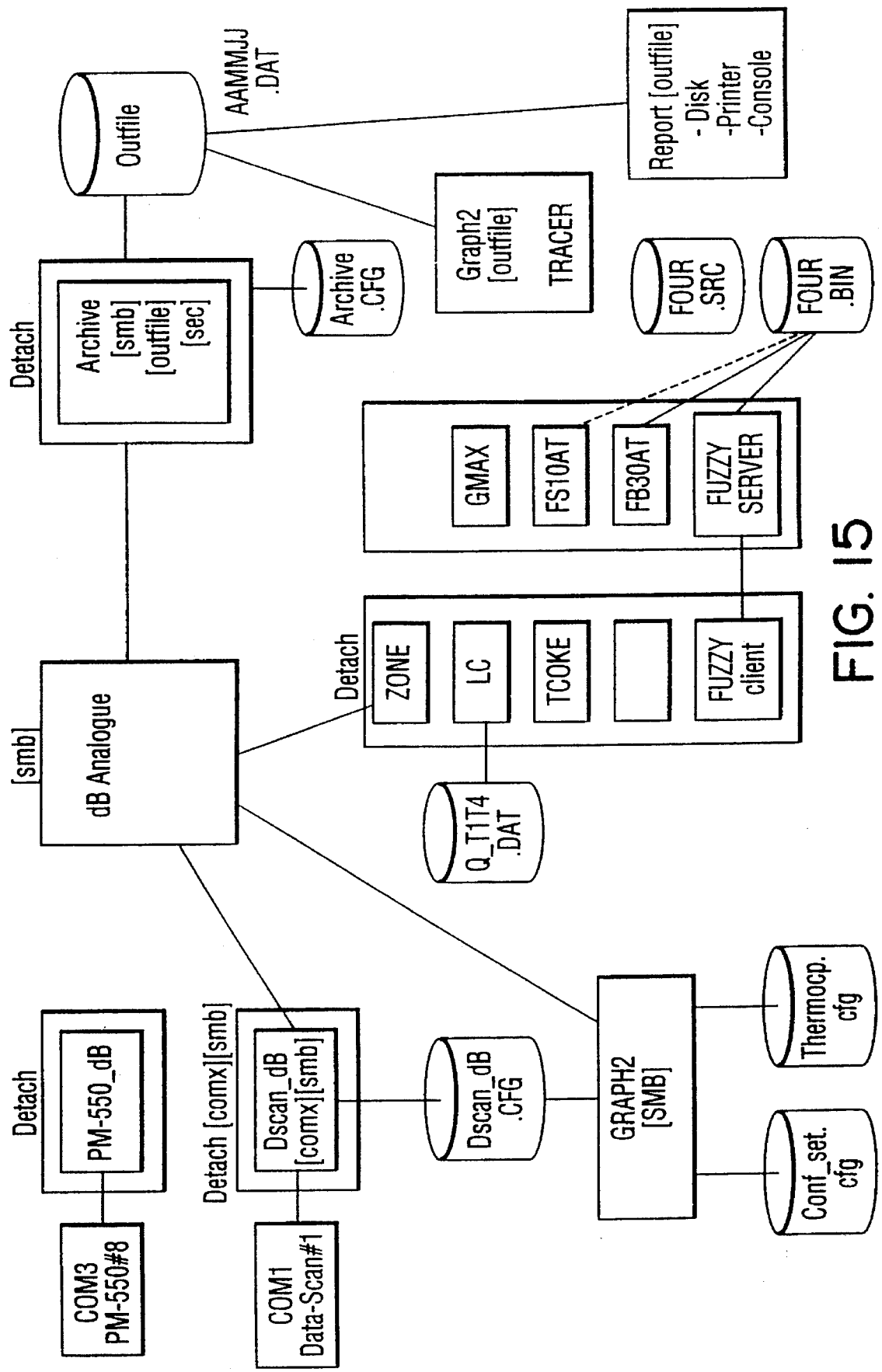
FIG. 15 is a block diagram showing the computer program architecture and protocol used for the process of the present invention.

The architecture and protocol for the computer program is shown in FIG. 15, in which:

Dscan_dB is a communication module which communicates with the DATASCAN 7000 by radio. The module interrogates the Data-Scan twice per second in order to obtain the process variables (temperature, angular position of the rotary calcining kiln, etc.) and stores them in memory in a resident data base [smb] of a microcomputer.

PM550-dB is a communication module which communicates with the PLC by direct link. The module interrogates the PLC once every two seconds in order to obtain the process variables ($M_{3\ air}$, $R_{sp}$, $G_{coke}$) and to return the new setpoint value to the PLC and stores them in memory in a resident database in the microcomputer.

Fuzzy-Client is a post treatment module which computes and prepares input values for the Fuzzy Logic Controller (FLC).

Fuzzy-Service is the main program which implements the control algorithm in fuzzy logic itself.

GMAX is the program which maximizes the production rate of the kiln. When the process is in stable condition, this program will increase the flow of the green coke according to a certain algorithm. This program will activate only if the PID loop of the green coke of the green coke scale is in the cascade mode. If not, the set point of the scale will be entered by the operator.

Graph2 is the computer graphic module for DATA display. This module displays the temperature of the thermocouples, the temperature of the coke, the position of the calcination zone, and the value of $L_c$ in graphic form. Furthermore, it permits the capture of the values of $L_c$ analyzed in the laboratory and the parameters of the configuration of the thermocouples and of different graphics.

Zone is the coke calcining zone computer module which calculates and displays in graphic form the position of the coke calcination zone.

Tcoke is a module which evaluates the temperature of the coke from the signals from the thermocouples.

$L_c$ is the module for calculating and predicting the value of $L_c$ of the coke. The algorithm used for the calculation is based on the correlation between the temperatures of the coke and measured $L_c$ values.

Archive is the data backup module which makes it possible to store in real time on disk or diskette, at intervals chosen by the operator, all of the values previously measured, predicted and calculated.

Tracer is the data extract module for ASCII permitting extraction of the archived data in the form of ASCII for use with other programs such as dBASE (trademark), LOTUS (trademark), etc.; and Cuisson is the baking refractory computation module making it possible to follow the baking of the refractory at the position of the thermocouple.

Figure 11:
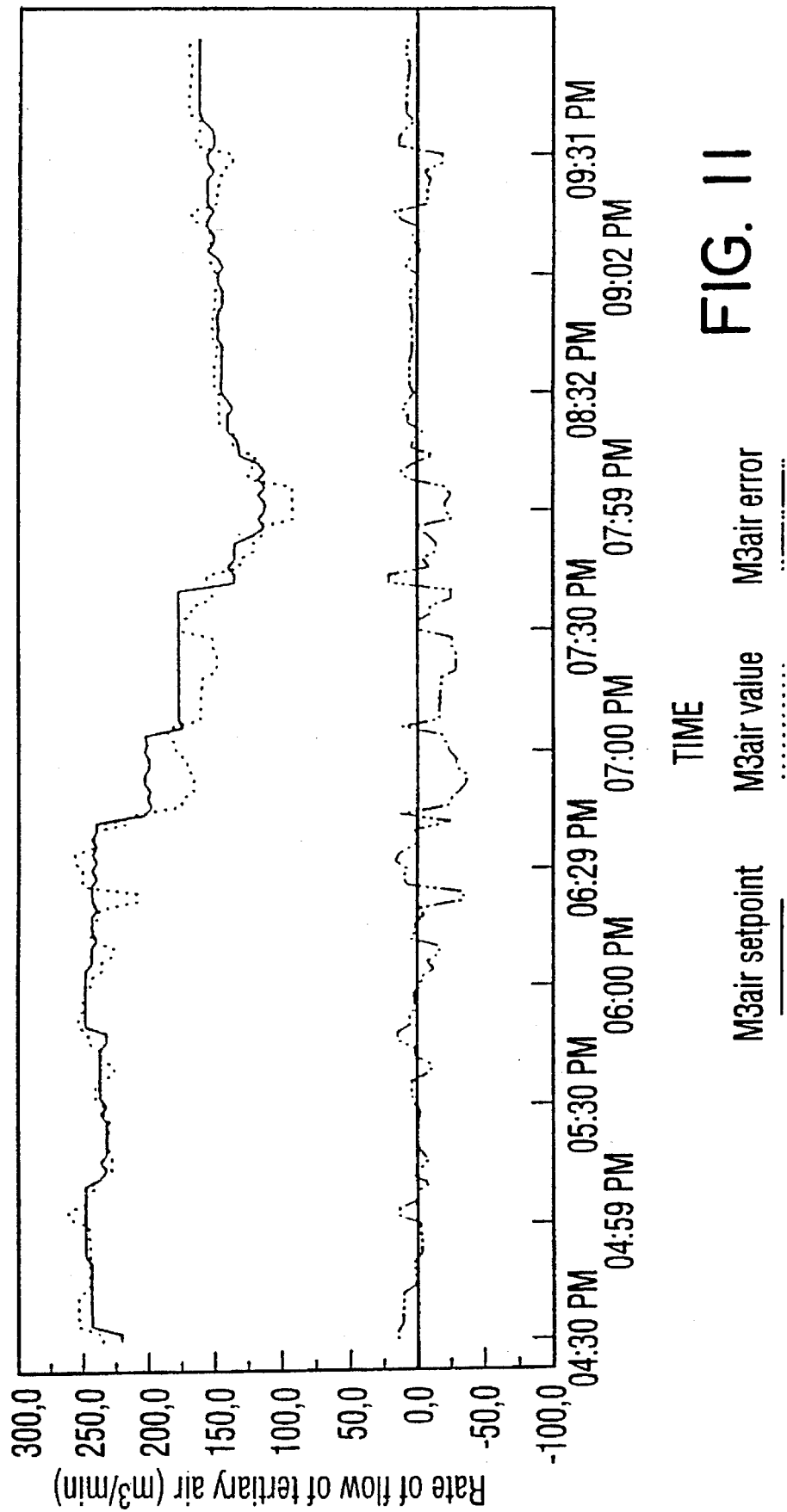
FIGS. 11 and 12 are examples of the tertiary air set point and the rotational set point output of the fuzzy logic controller.
Figure 12:
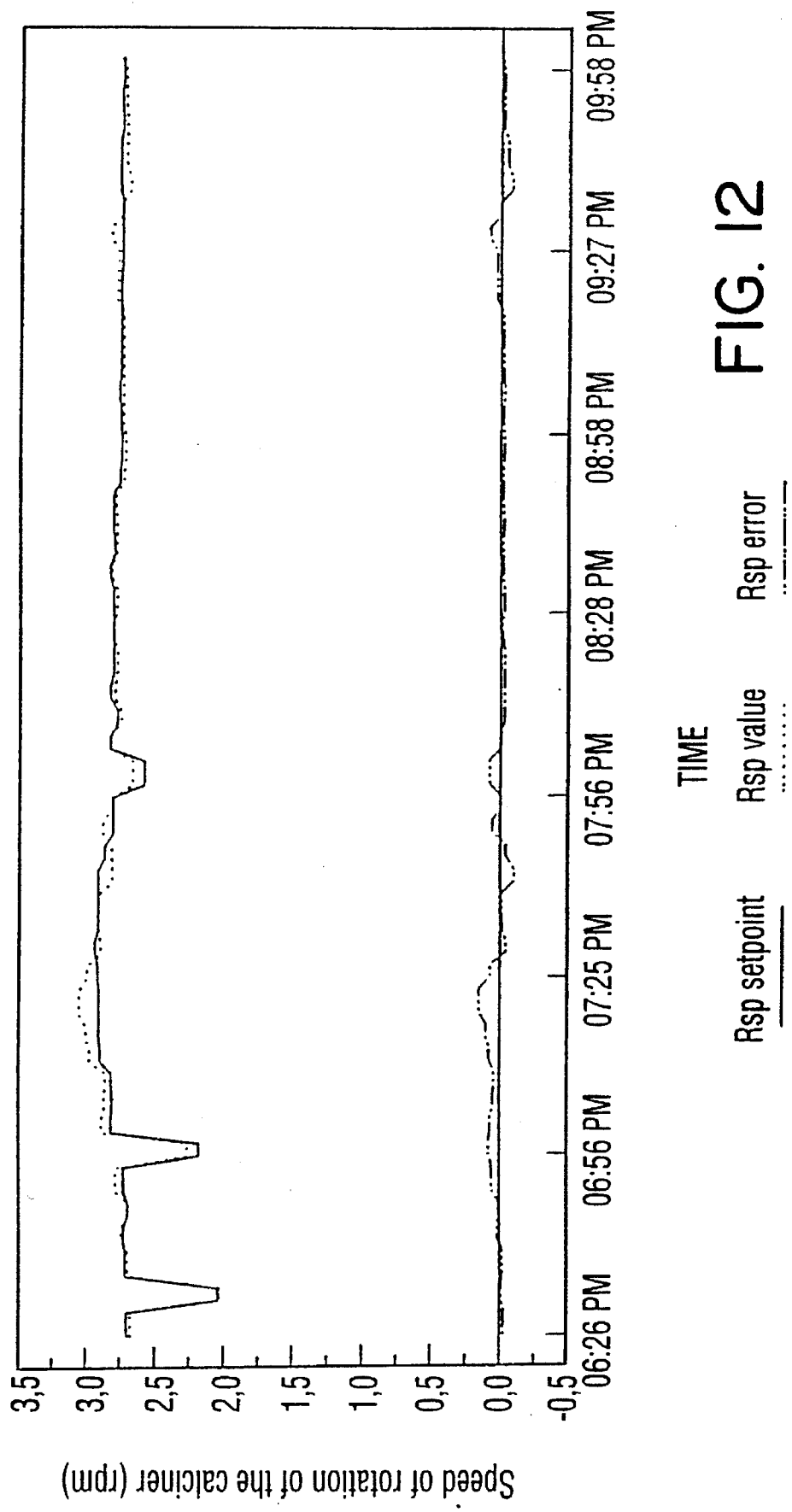
Figure 13:
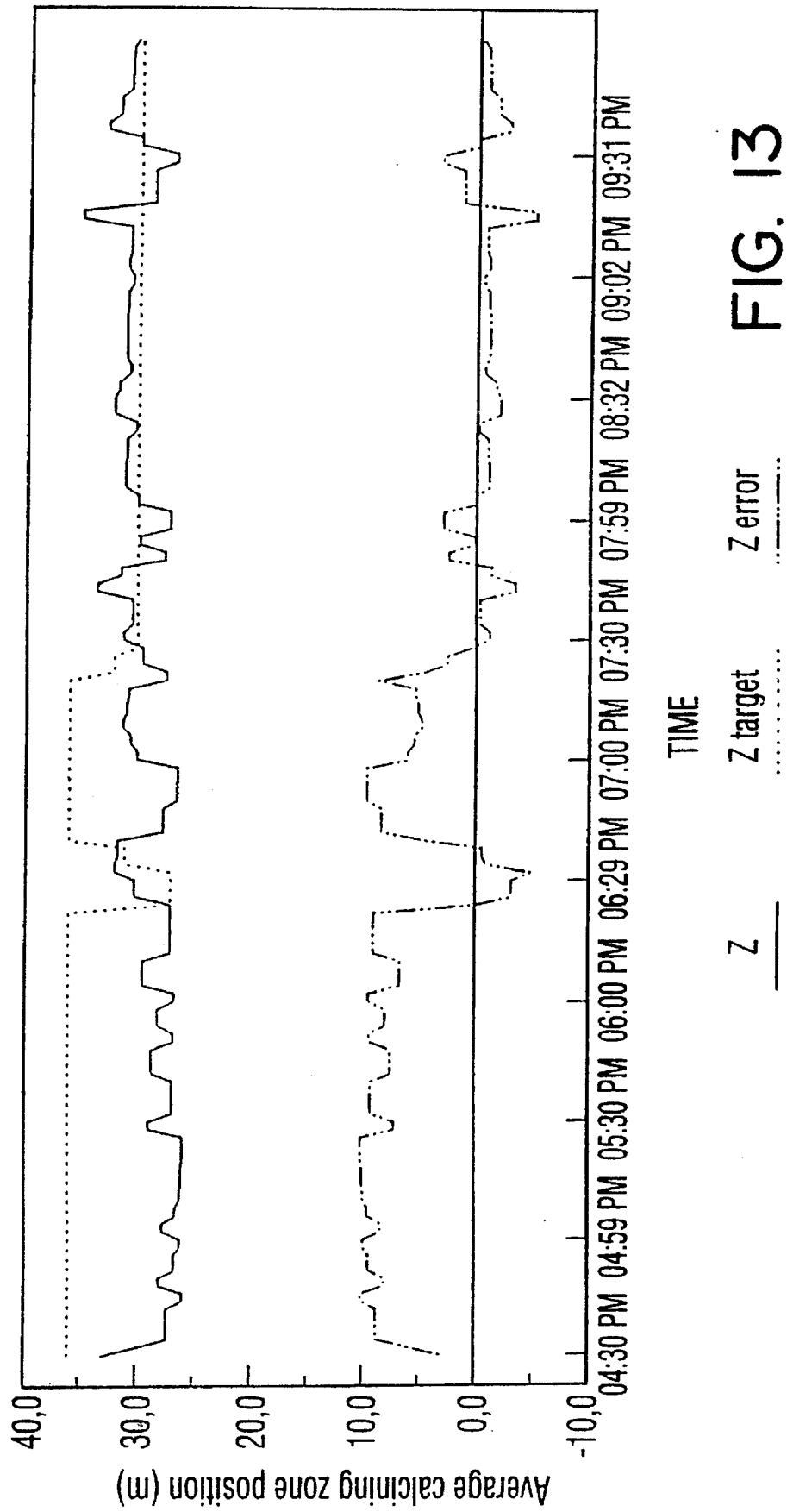
FIGS. 13 and 14 are examples of the calcining zone position and the coke mean crystalline length compared with the process target.
Figure 14:
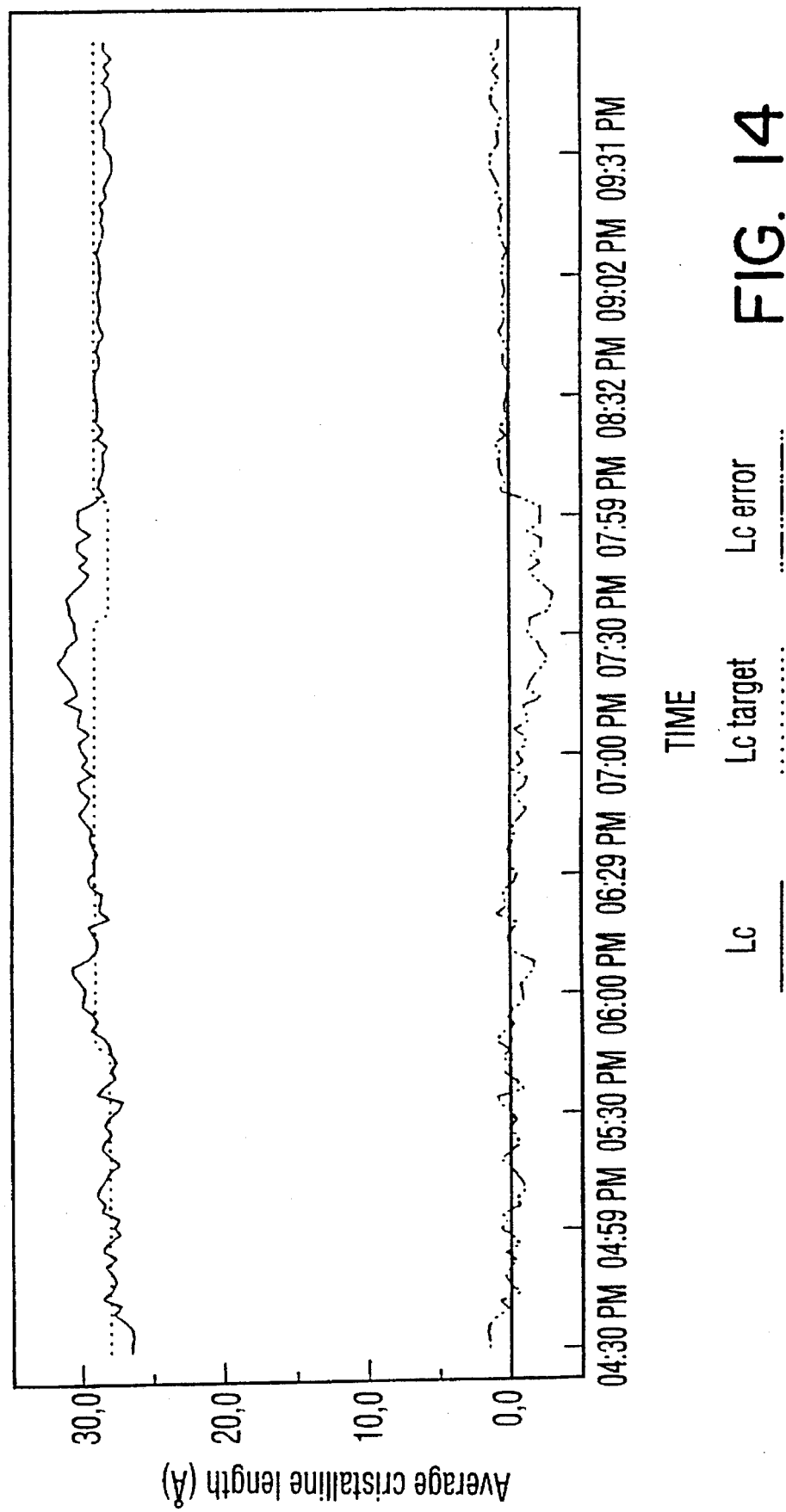

FIGS. 11 and 12 are examples for the normal production day of a 60 m long rotary calcining kiln, of the $M_{3\ air}$ and $R_{sp}$ set points computed by the Fuzzy Logic Controller described earlier. FIGS. 13 and 14 are examples of the comparison between $Z_{target}$ and $Lc_{target}$ obtained during the "on-line" application of the new set point proposed by the Fuzzy Logic Controller.

EXAMPLE

The advantages and effects of the controller were demonstrated in the operation of a rotary kiln for calcining green petroleum coke.

The rotary calciner was approximately 60 m long and 2 m in diameter. The kiln slope was 4 mm per meter, with the feed end being higher than the discharge end. The kiln was rotated at between 0.5 and 3 rpm. The kiln was used to calcine green petroleum coke having a volatile content of up to 15%, which was calcined to give a density of 2 g/cc or greater, which corresponded to an average crystal length of between 29 and 31 angstroms. The calcined coke was used in the manufacture of electrodes used in the Hall Heroult reduction process to convert alumina to metallic aluminum.

The heating was achieved without substantial combustion of the carbon itself by using the combustibles constituted in the volatile matter and released during the calcining operation as the fuel for the process. It was burned with a supply of air which was forcibly introduced into the central zone of the kiln by tuyeres or nozzles. These were located over a linear distance of 6 m, beginning with the first tuyere about 18 meters from the discharge end. These tuyeres supplied between 200 and 425 cubic meters per minute of air to the process. The residence time of the coke in the kiln was 45 minutes or more.

In this operation, the following variables had to be controlled:

$L_c$ the average crystal length, in angstroms, of the product;

$M_{3\ air}$ the volume of tertiary air fed to the kiln, measured in $m^3$/min;

rpm rotations per minute of the kiln;

feed rate the rate at which green petroleum coke is fed to the kiln.

Date: Nov. 24

The operation was characterized by a high capacity in the kiln, and a low production rate. Around 7:00 pm, the controller requested a substantial increase of $M_3$ air from 140 to 300 $m^3$/min; for a period of four hours, in order to keep $L_c$ on target.

The laboratory determination of the $L_c$ values of the product confirmed that the $L_c$ value had been maintained constant.

Date: Nov. 25

Operations were normal. The kiln was operated in the automatic mode for most of the day. Around 1:44 am, the feed rate was increased from 19 to 21.5 tons/hour. This rate was maintained for ½ hour; at the end of this time, the operator changed to manual control of the $M_{3\ air}$. This resulted in the Lc decreasing to values below 28, and caused the production rate to drop from the target of 21.5 to 19 tons/hour. The operator then changed back to automatic control, which made the Lc value increase to above 28, and the production rate increased from 19 to 21.5 tons/hour for the next 5 hours.

This is an example of the good operating conditions resulting from the adjustments made by the controller.

At 7:30 am, the operator stopped the automatic control of the feed rate and $M_{3\ air}$. Afterwards, the operator alternated for periods of one hour between automatic and manual control of the tertiary air.

At 3:00 pm, the rpm dropped from 2.4 to 1.8 for 15 minutes. The operator thought that this decrease was an error by the controller. However, subsequent investigations showed that the feeding of coke had been stopped for this period; the controller had detected this and had therefore decreased the rpm.

This Example demonstrates that the controller can detect changes and blockages in the feeding of coke and can adjust the rpm to correspond to the real production rate.

Date: Nov. 28

Operations were good. The controller requested an increase in production rate equivalent to 1.5 tons/hour, for the entire day. This represents a considerable increase in the nominal rate.

Date: Nov. 30

Operations were good. The operator changed to automatic control for rpm and $M_{3\ air}$. During the entire day, the controller requested an average increase of 0.2 tons/hour in the coke feed rate.

Date: Dec. 12

Operations were good. The operator used automatic control for $M_{3\ air}$ and the rpm of the kiln for 15 consecutive hours. The controller requested and average increase in the feed rate of 0.4 tons/hour.

While the invention has been described as applied to the control of rotary calcining kilns, particularly those intended for the calcination of green petroleum coke, it will be apparent that the invention may also be applied to kilns of other types in which the position of a high temperature zone is to be controlled in order to affect the properties of a product emerging from the kiln, or in order to avoid problems during the operation of the kiln.

It will also be apparent that various other modifications and alterations of the process and apparatus of the invention will be possible without departing from the scope of the invention as defined by the following claims. All such alterations and modifications form part of this invention.

We claim:

1. A process of controlling a rotary calcining kiln having feed material inlet for material to be calcined, a calcined product outlet and a high temperature zone in which said material is calcined, said high temperature zone being movable within said rotary calcining kiln according to changes in operational control variables of the calcining kiln capable of affecting the position of the high temperature zone, which process comprises measuring temperature within said calcining kiln, at least in a region overlapping desired position for said high temperature zone, and adjusting at least one of said control variables to move said high temperature zone towards said desired position when said high temperature zone towards said desired position, wherein said temperatures are measured by a plurality of thermocouples, each having thermocouple junctions protected from abrasion by a layer of heat and abrasion resistant material positioned within said rotary calcining kiln, said thermocouples each being positioned in said kiln to be successively covered and uncovered by said material as said kiln rotates.

2. A process according to claim 1 wherein said rotary calcining kiln is a petroleum coke rotary calcining kiln equipped with a plurality of tuyeres in said predetermined desired position for said high temperature zone for introducing tertiary air, and is for producing calcined coke particles of average crystal length ($L_c$) and wherein said control variables include a rate of flow of tertiary air ($M_{3air}$) into said rotary calcining kiln through tuyeres, a speed of rotation ($R_{sp}$) of said rotary calcining kiln and a feed rate ($G_{coke}$) of said petroleum coke to said rotary calcining kiln, the position of said high temperature zone being changed as required by adjusting said variables according to a detected position of said high temperature zone and according to an actual average crystal length ($L_c$) of said calcined coke particles in order to move said high temperature zone towards said desired position and to maintain said average crystal length ($L_c$) in a predetermined range.

3. A process of controlling a rotary calcining kiln a feed material inlet for material to be calcined, a calcined product outlet and a high temperature zone in which said material is calcined, said high temperature zone being movable within said rotary calcining kiln according to changes in operational control variables of the calcining kiln capable of affecting the position of the high temperature zone, which process comprises measuring temperatures within said calcining kiln, at least in a region overlapping a predetermined desired position for said high temperature zone, and adjusting at least one of said control variables to move said high temperature zone towards said desired position when said high temperature zone deviates from said desired position, wherein said temperatures are measured by thermocouples having thermocouple junctions protected from abrasion by a layer of heat and abrasion resistant material positioned within said rotary calcining kiln, and wherein said material is made of silicon carbide platelet-reinforced alumina matrix ceramic.

4. A process of controlling a rotary calcining kiln having a feed material inlet for material to be calcined, a calcined product outlet and a high temperature zone in which said material is calcined, said high temperature zone being moveable within said rotary calcining kiln according to changes in operational control variables of the calcining kiln capable of affecting the position of the high temperature zone, which process comprises measuring temperatures within said calcining kiln, at least in a region overlapping a predetermined desired position for said high temperature zone, and adjusting at least one of said control variables to move said high temperature zone towards said desired position when said high temperature zone deviates from said desired position, wherein said temperatures are measured by thermocouples having thermocouple junctions protected from abrasion by a layer of heat and abrasion resistant material positioned within said rotary calcining kiln, and wherein said material is made of 5–50% by volume of SiC platelets and 50–95% by weight of alumina particles.

5. A process according to claim 4 wherein said temperatures are measured using thermocouples having thermocouple junctions protected by sheaths having been made by hot pressing a mixture of said SiC platelets and alumina particles at a temperature in the range of 1450°–1700° C. and a pressure in the range of 4000–8000 p.s.i. for a period of 0.5 to 2 hours under an atmosphere of an unreactive gas.

6. A process of controlling a petroleum coke rotary calcining kiln for producing calcined coke particles of average crystal length ($L_c$), said kiln having a feed material inlet for material to be calcined, a calcined product outlet and a high temperature zone in which said material is calcined, said high temperature zone being movable within said rotary calcining kiln according to changes in operational control variables of the calcining kiln capable of affecting the position of the high temperature zone, said variables being selected from the group consisting of a rate of flow of tertiary air ($M_{3air}$) into said rotary calcining kiln, a speed of rotation ($R_{sp}$) of said rotary kiln and a feed rate ($G_{coke}$) of said petroleum coke to said rotary calcining kiln, said kiln also having a plurality of tuyeres in a predetermined desired position for said high temperature zone for introducing tertiary air, which process comprises measuring temperatures within said calcining kiln, at least in a region overlapping a predetermined desired position for said high temperature zone, and adjusting at least one of said control variables to move said high temperature zone towards said desired position and to maintain an average crystal length ($L_c$) in a predetermined range according to a detected position of said high temperature zone and according to an actual average crystal length ($L_c$) of said calcined coke particles when said high temperature zone deviates from said desired position, wherein said temperatures are measured by thermocouples having thermocouple junctions protected from abrasion by a layer of heat and abrasion resistant material positioned within said rotary calcining kiln, wherein said variables are adjusted according to the following strategy:

high (H), low (L) and target (T) zones are established for the position (Z) of the high temperature zone in the rotary calcining kiln and the average crystal length $L_c$ giving rise to nine possible states for the rotary calcining kiln corresponding to combinations of said high, low and target zones, said thermocouples are used to find the actual position of the high temperature zone within the rotary calcining kiln, the average crystal length $L_c$ of the calcined product emerging from the rotary calcining kiln is calculated or measured, and said control variables are adjusted in the table shown below:

| State of the rotary calcining kiln | Z (m) | $L_c$ (Å) | Operational Control Variables | | | |
|---|---|---|---|---|---|---|
| | | | $M_{3air}$ | $R_{sp}$ | $G_{coke}$ | Time Constant (h) |
| 1 | H | H | − | + | x | 1 |
| 2 | H | T | − | x | x | ¼ to ½ |
| 3 | H | L | − − | + | x | 1 |
| 4 | T | H | − | x | x | ¼ to ½ |
| 5 | T | T | x | x | − | ½ to 1 |
| 6 | T | L | + | x | x | ¼ to ½ |
| 7 | L | H | + + | − | x | 1 |
| 8 | L | T | + | x | x | ¼ to ½ |
| 9 | L | L | − | − | x | 1 | wherein:
x means no change in the control variable
− means reduce the variable by a predetermined amount Δ
− − means reduce the amount by 2Δ
+ means increase the variable by Δ
+ + means increase the variable by 2 Δ.

said time constant being the length of time the variables are to remain unchanged after the adjustment indicated in the table above.

7. A process according to claim 6 wherein said amount Δ is predetermined by a fuzzy logic controller.

8. A process of controlling a petroleum coke rotary calcining kiln for producing calcined coke particles of average crystal length ($L_c$), said kiln having a feed material inlet for material to be calcined, a calcined product outlet and a high temperature zone in which said material is calcined, said high temperature zone being movable within said rotary calcining kiln according to changes in operational control variables of the calcining kiln capable of affecting the position of the high temperature zone, said variables being selected from the group consisting of a rate of flow of tertiary air ($M_{3air}$) into said rotary calcining kiln, a speed of rotation ($R_{sp}$), of said rotary kiln and a feed rate ($G_{coke}$) of said petroleum coke to said rotary calcining kiln, said kiln also having a plurality of tuyeres in a predetermined desired position for said high temperature zone for introducing tertiary air, which process comprises measuring temperatures at a plurality of positions within said calcining kiln, at least in a region overlapping a predetermined desired position for said high temperature zone, and adjusting at least one of said control variables to move said high temperature zone towards said desired position and to maintain an average crystal length ($L_c$) in a predetermined range according to a detected position of said high temperature zone and according to an actual average crystal length ($L_c$) of said calcined coke particles when said high temperature zone deviates from said desired position, wherein said temperatures are measured by a plurality of thermocouples having thermocouple junctions protected from abrasion by a layer of heat and abrasion resistant material positioned within said rotary calcining kiln, wherein said thermocouples rotate with said furnace and are successively covered and uncovered by a bed of said coke as the furnace rotates and an actual position of the high temperature zone is found from temperatures measured by said thermocouples by first calculating the temperature of the coke bed at the position of each thermocouple by the equation:

$$\frac{T_h(C) - T_{coke}}{T_h(O) - T_{coke}} = e^{(-t/ae^{-bT_{coke}})}$$

wherein a and b are constants, $T_{coke}$ is the temperature of the coke bed, $T_h(O)$ is the temperature of the thermocouple before it is covered by the coke bed, and $T_h(C)$ is the temperature of the thermocouple one or two cycles after $T_hO$, then calculating a friction angle $\phi$ of the coke bed at the position of each thermocouple using the equation:

$$\phi = \frac{\Gamma}{2} - \alpha$$

$$\alpha = 270° - \theta\downarrow$$

then $$\Gamma = \frac{\theta\uparrow + \theta\downarrow}{2} - 270°$$

wherein $\Gamma$, $\alpha$, $\theta\uparrow$ and $\theta\downarrow$ are angles which relate to the position of the coke bed, and plotting the temperature $T_{coke}$ as a function of position in the rotary calcining kiln and finding the minimum of the $\phi$ values, wherein the high temperature zone is the position of said minimum value.

9. A process of controlling a rotary calcining kiln having a feed material inlet for material to be calcined, a calcined product outlet, a kiln wall and a high temperature zone within the kiln in which said material is calcined, said high temperature zone being movable within said rotary calcining kiln according to changes in operational control variables of the calcining kiln capable of affecting the position of the high temperature zone, which process comprises:

establishing a desired position for said high temperature zone within the kiln for the material to be calcined;

operating said kiln and measuring temperatures of said material within the kiln at a plurality of positions spaced from each other along the kiln, at least in a region overlapping said desired position for said high temperature zone;

monitoring an actual position of said high temperature zone within the kiln; and adjusting at least one of said control variables to move said high temperature zone towards said desired position when said actual position of said high temperature zone deviates from said desired position;

wherein said temperatures are measured by detecting varying temperature signals from a plurality of heat and abrasion resistant thermocouples extending through the kiln wall and positioned in said kiln to be successively covered and uncovered by said material as said kiln rotates and calculating actual material temperatures from said varying temperature signals.

10. A process of controlling a rotary calcining kiln having a feed material inlet for material to be calcined, a calcined product outlet, a kiln wall and a high temperature zone within the kiln in which said material is calcined, said high temperature zone being movable within said rotary calcining kiln according to changes in operational control variables of the calcining kiln capable of affecting the position of the high temperature which process comprises:

establishing a desired position for said high temperature zone within the kiln for the material to be calcined;

operating said kiln and measuring temperatures of said material within the kiln at various positions spaced from each other along the kiln, at least in a region overlapping said desired position for said high temperature zone;

monitoring an actual position of said high temperature zone within the kiln; and adjusting at least one of said control variables to move said high temperature zone deviates from said desired position;

wherein said temperatures are measured by detecting varying temperature signals from heat and abrasion resistant thermocouples extending through the kiln wall to contact said material in the kiln intermittently as the kiln rotates and calculating actual material temperatures from said varying temperature signals; and wherein said actual temperature of each thermocouple are calculated by an equation as follows:

$$\frac{T_h(C) - T}{T_h(O) - T} = e^{(-t/ae^{-bT})}$$

wherein a and b are constants,

T is the temperature of a bed of the material in the kiln, $T_h(O)$ is the temperature of the material before it enters the material bed, $T_h(C)$ is the temperature of the thermocouple one or two cycles of rotation of the kiln after $T_h(O)$, and t represents time.

11. A control system for a rotary calcining kiln having a feed material inlet, a calcined product outlet and a high temperature zone being movable within said rotary calcining kiln according to changes of operational control variables capable of affecting the position of said high temperature zone, which system comprises:

a plurality of thermocouples provided within said rotary calcining kiln at various positions spaced from each other at least in a region overlapping a predetermined desired position of said high temperature zone, said thermocouples each being positioned in said kiln to be successively covered and uncovered by said material as said kiln to be successively covered and uncovered by said material as said kiln rotates, said thermocouples each comprising thermocouple junctions protected by a layer of heat and abrasion-resistant material;

means for determining an actual position of said high temperature zone from signals from said thermocouples; and means for directing adjustment of said control variables to move said high temperature zone towards said predetermined desired position when said high temperature zone deviates from said desired position.

12. A system according to claim 11 wherein said means for determining an actual position of said high temperature zone from signals from said thermocouples comprises computer means for calculating actual temperatures from said signals.

13. A system according to claim 12 wherein said computer means includes a fuzzy logic controller for estimating changes that are to be made to said control variables to effect said adjustment of said variables.

14. A system according to claim 11 wherein said means for directing adjustment of said control variables to move said high temperature zone towards said predetermined desired position comprises computer means for adjusting said control variables according to a predetermined procedure depending on said actual position of said high temperature zone.

15. A system according to claim 14 for a rotary coke rotary calcining kiln for producing calcined coke particles having an average crystal size $L_c$, wherein said means for directing adjustment of said control variables also directs said adjustment in such a way as to maintain $L_c$ in a desired size range.

16. A control system for a rotary calcining kiln having a feed material inlet, a calcined product outlet and a high temperature zone being movable within said rotary calcining kiln according to changes operational control variables capable of affecting the position of said high temperature zone, which system comprises:

a plurality of thermocouples provided within said rotary calcining kiln at various positions spaced from each other at least in a region overlapping a predetermined desired position of said high temperature zone, said thermocouples each comprising thermocouple junctions protected by a layer of heat and abrasion-resistant material;

means for determining an actual position of said high temperature zone from signals from said thermocouples; and means for directing adjustment of said control variables to move said high temperature zone, towards said predetermined desired position when said high temperature zone deviates from said desired position; and wherein said heat and abrasion resistant material is made of silicon carbide platelet-reinforced alumina matrix ceramic.

17. A control system for a rotary calcining kiln having a feed material inlet, a calcined product outlet and a high temperature zone being movable within said rotary calcining kiln according to changes of operational control variables capable of affecting the position of said high temperature zone, which comprises:

a plurality of thermocouples provided within said rotary calcining kiln at various positions spaced from each other at least in a region overlapping a predetermined desired position of said high temperature zone, said thermocouples each comprising thermocouple junctions protected by a layer of heat and abrasion-resistant material;

means for determining an actual position of said high temperature zone from signals from said thermocouples; and means for directing adjustment of said control variables to move said high temperature zone towards said predetermined desired position when said high temperature zone deviates from said desired position; and wherein said heat and abrasion resistant material is a silicon carbide platelet-reinforced alumina matrix made of 5–50% by volume of SiC platelet and 50–95% by weight of alumina particles.

18. A control system for a rotary calcining kiln having a feed material inlet, a calcined product outlet and a high temperature zone being movable within said rotary calcining kiln according to changes of operational control variables capable of affecting the position of said high temperature zone, which system comprises:

a plurality of thermocouples provided within said rotary calcining kiln at various positions spaced from each other at least in a region overlapping a predetermined desired position of said high temperature zone, said thermocouples each comprising thermocouple junctions protected by a layer of heat and abrasion-resistant material;

means for determining an actual position of said high temperature zone from signals from said thermocouples; and means for directing adjustment of said control variables to move said high temperature zone towards said predetermined desired position when said high temperature zone deviates from said desired position; and wherein said heat and abrasion resistant material is a silicon carbide platelet-reinforced alumina matrix ceramic made by hot pressing a mixture of 5–50% by weight of SiC platelets and 50–95% by weight of alumina particles at a temperature in the range of 1450°–1700° C. and a pressure in the range of 4000–8000 p.s.i. for a period of 0.5 to 2 hours under an atmosphere of an unreactive gas.

\* \* \* \* \*